(12) United States Patent
Lukka et al.

(10) Patent No.: US 11,851,292 B2
(45) Date of Patent: Dec. 26, 2023

(54) WASTE SORTING GANTRY ROBOT

(71) Applicant: MP ZenRobotics Oy, Vantaa (FI)

(72) Inventors: Tuomas Lukka, Helsinki (FI); Maciej Borkowski, Helsinki (FI)

(73) Assignee: MP ZenRobotics Oy, Vantaa (FI)

( * ) Notice: Subject to any disclaimer, the term of this patent is extended or adjusted under 35 U.S.C. 154(b) by 0 days.

(21) Appl. No.: 17/049,564

(22) PCT Filed: Apr. 18, 2019

(86) PCT No.: PCT/FI2019/050319
§ 371 (c)(1),
(2) Date: Oct. 21, 2020

(87) PCT Pub. No.: WO2019/207201
PCT Pub. Date: Oct. 31, 2019

(65) Prior Publication Data
US 2021/0061588 A1 Mar. 4, 2021

(30) Foreign Application Priority Data

Apr. 22, 2018 (SE) ..................... 1830137-4

(51) Int. Cl.
*B65G 47/91* (2006.01)
*B07C 5/36* (2006.01)
(Continued)

(52) U.S. Cl.
CPC ............ *B65G 47/911* (2013.01); *B07C 5/368* (2013.01); *B07C 2501/0054* (2013.01);
(Continued)

(58) Field of Classification Search
CPC ....... B65G 47/91; B65G 47/911; B07C 5/363; B07C 5/368; B07C 2501/0054; B07C 2501/0063; B25J 9/026; B25J 15/0616
(Continued)

(56) References Cited

U.S. PATENT DOCUMENTS 4,679,291 A 7/1987 Schmeal et al.
4,763,941 A 8/1988 Sniderman
(Continued)

FOREIGN PATENT DOCUMENTS

CN 101508181 4/2011
CN 102431787 5/2012
(Continued)

OTHER PUBLICATIONS

International Search Report and Written Opinion issued in PCT/FI2019/050320 dated Jul. 30, 2019.
(Continued)

*Primary Examiner* — Michael McCullough
*Assistant Examiner* — Molly K Devine
(74) *Attorney, Agent, or Firm* — Knobbe, Martens, Olson & Bear LLP

(57) ABSTRACT

A waste sorting robot gripper comprises a suction cup engageable with the surface of a waste object. The suction cup has an air hole for evacuating air from the suction cup. A suction tube is coupled to the suction cup. The suction tube comprises a longitudinal axis. A first air inlet is in fluid communication with the air hole at one end of the suction tube and an air outlet at the other end of the suction tube. A path of the air flow between the air inlet and the air outlet is substantially along the longitudinal axis. The suction tube comprises a second air inlet in fluid communication with an air source, the second air inlet being between the first air inlet and the air outlet.

22 Claims, 11 Drawing Sheets

(51) Int. Cl.
    *B25J 9/02*       (2006.01)
    *B25J 15/06*      (2006.01)

(52) U.S. Cl.
    CPC ....... *B07C 2501/0063* (2013.01); *B25J 9/026* (2013.01); *B25J 15/0616* (2013.01)

(58) Field of Classification Search
    USPC ........................................................ 209/552
    See application file for complete search history.

(56)            References Cited

U.S. PATENT DOCUMENTS

| | | | |
|---|---|---|---|
| 4,998,442 | A | 3/1991 | Brown et al. |
| 5,188,411 | A | 2/1993 | Golden |
| 5,244,242 | A | 9/1993 | Goedecke et al. |
| 5,423,431 | A | 6/1995 | Westin |
| 5,572,785 | A | 11/1996 | Tveit |
| 5,617,338 | A | 4/1997 | Sugano |
| 5,617,898 | A | 4/1997 | Nagai |
| 5,626,378 | A * | 5/1997 | Puhl ............... B25B 11/007 |
| | | | 294/186 |
| 5,636,966 | A | 6/1997 | Lyon et al. |
| 5,733,098 | A | 3/1998 | Lyon et al. |
| 5,735,782 | A | 4/1998 | Berg |
| 5,934,864 | A | 8/1999 | Lyon et al. |
| 5,992,691 | A | 11/1999 | Post et al. |
| 6,024,392 | A | 2/2000 | Blatt |
| 6,213,709 | B1 * | 4/2001 | Hebrank ............... A01K 43/00 |
| | | | 414/737 |
| 6,256,553 | B1 | 7/2001 | Erikkila |
| 6,817,639 | B2 | 11/2004 | Schmalz et al. |
| 8,777,284 | B2 | 7/2014 | Schaller et al. |
| 8,880,217 | B2 | 11/2014 | Izumi et al. |
| 9,082,454 | B2 | 7/2015 | Yao et al. |
| 9,205,558 | B1 | 12/2015 | Zevenbergen et al. |
| 9,272,417 | B2 | 3/2016 | Konolige et al. |
| 9,486,926 | B2 | 11/2016 | Kawano |
| 9,600,798 | B2 | 3/2017 | Battles et al. |
| 9,914,213 | B2 | 3/2018 | Vijayanarasimhan et al. |
| 10,449,572 | B2 | 10/2019 | Ripley |
| 10,464,105 | B2 | 11/2019 | Koistinen et al. |
| 10,482,120 | B2 | 11/2019 | Ripley |
| 10,576,630 | B1 | 3/2020 | Diankov et al. |
| 10,639,790 | B1 | 5/2020 | Bacon et al. |
| 2003/0012925 | A1 | 1/2003 | Gorrell |
| 2003/0133775 | A1 | 7/2003 | Specher |
| 2004/0094979 | A1 | 5/2004 | Damhuis |
| 2005/0218677 | A1 | 10/2005 | Ilich |
| 2006/0053624 | A1 | 3/2006 | Maeda et al. |
| 2011/0076128 | A1 | 3/2011 | Johnson |
| 2012/0032461 | A1 | 2/2012 | Hukelmann |
| 2013/0127192 | A1 * | 5/2013 | Regan ............... B32B 38/1858 |
| | | | 294/185 |
| 2013/0127194 | A1 | 5/2013 | Regan et al. |
| 2014/0025197 | A1 | 1/2014 | Mattern |
| 2014/0062112 | A1 | 3/2014 | Ho-Young |
| 2015/0016933 | A1 | 1/2015 | Ochiishi |
| 2015/0241203 | A1 | 8/2015 | Jordil |
| 2015/0328779 | A1 | 11/2015 | Bowman et al. |
| 2016/0332310 | A1 | 11/2016 | Conall |
| 2017/0028562 | A1 | 2/2017 | Yamazaki et al. |
| 2017/0073174 | A1 | 3/2017 | Tanaka |
| 2017/0174439 | A1 | 6/2017 | Ripley |
| 2017/0291308 | A1 | 10/2017 | Junichi |
| 2017/0355083 | A1 | 12/2017 | Wigren |
| 2018/0036774 | A1 * | 2/2018 | Lukka ............... B07C 5/3422 |
| 2018/0050451 | A1 | 2/2018 | Takanishi et al. |
| 2019/0030571 | A1 | 1/2019 | Horowitz et al. |
| 2019/0084012 | A1 | 3/2019 | McCoy et al. |
| 2019/0130560 | A1 | 5/2019 | Horowitz et al. |
| 2019/0217342 | A1 | 7/2019 | Parr et al. |
| 2020/0048015 | A1 | 2/2020 | Martin et al. |
| 2020/0077074 | A1 | 3/2020 | Denenberg et al. |
| 2020/0087118 | A1 | 3/2020 | Sato et al. |
| 2021/0237260 | A1 | 8/2021 | Holopainen et al. |
| 2021/0237262 | A1 | 8/2021 | Holopainen et al. |

FOREIGN PATENT DOCUMENTS

| | | |
|---|---|---|
| CN | 203212009 | 9/2013 |
| CN | 103787059 | 5/2014 |
| CN | 204057223 | 12/2014 |
| CN | 104513012 | 4/2015 |
| CN | 104589351 | 5/2015 |
| CN | 105196302 | 12/2015 |
| CN | 105215076 | 1/2016 |
| CN | 105372510 | 3/2016 |
| CN | 107363405 | 11/2017 |
| CN | 107650139 | 2/2018 |
| CN | 107738264 | 2/2018 |
| CN | 106362957 | 5/2018 |
| CN | 108032324 | 5/2018 |
| CN | 108971190 | 12/2018 |
| CN | 109013384 | 12/2018 |
| CN | 109176522 | 1/2019 |
| CN | 109249402 | 1/2019 |
| CN | 109433633 | 3/2019 |
| CN | 110116415 | 8/2019 |
| CN | 209866708 | 12/2019 |
| DE | 2455284 | 5/1976 |
| DE | 4440748 A1 | 5/1996 |
| DE | 102010029662 | 12/2011 |
| DE | 102015220413 | 4/2017 |
| DK | 3056289 | 1/2019 |
| EP | 0253229 | 1/1988 |
| EP | 0706838 | 4/1996 |
| EP | 1918479 | 5/2008 |
| EP | 2476813 | 7/2012 |
| EP | 2585256 | 5/2013 |
| EP | 2694224 | 2/2014 |
| EP | 2758216 | 7/2014 |
| EP | 2810901 | 3/2016 |
| EP | 3056288 | 8/2016 |
| EP | 3056289 | 8/2016 |
| EP | 3236083 | 10/2017 |
| EP | 3254998 | 12/2017 |
| EP | 3496873 | 6/2019 |
| EP | 3626412 | 3/2020 |
| EP | 3658302 | 6/2020 |
| EP | 3672764 | 7/2020 |
| EP | 3674040 | 7/2020 |
| EP | 3677388 | 7/2020 |
| GB | 2325915 | 12/1998 |
| GB | 2354752 A | 4/2001 |
| IT | MI20 081 360 | 1/2010 |
| JP | S5045304 | 4/1975 |
| JP | 61-249292 | 11/1986 |
| JP | H01 240287 | 9/1989 |
| JP | H03154793 | 7/1991 |
| JP | H05318369 | 12/1993 |
| JP | H0630857 | 4/1994 |
| JP | H0740273 | 2/1995 |
| JP | 05089337 | 12/1996 |
| JP | H092682 | 1/1997 |
| JP | 9131575 | 5/1997 |
| JP | 10-202571 | 8/1998 |
| JP | H11198076 | 7/1999 |
| JP | 201138280 | 5/2001 |
| JP | 2002301683 | 10/2002 |
| JP | 2007040273 | 2/2007 |
| JP | 4947691 | 6/2012 |
| JP | 2012115916 | 6/2012 |
| JP | 2013252568 | 12/2013 |
| JP | 2014516810 | 4/2014 |
| JP | 5688924 | 3/2015 |
| JP | 2016068034 | 5/2016 |
| JP | 2016225336 | 12/2016 |
| JP | 2020022929 | 2/2020 |
| JP | 2020062633 | 4/2020 |
| KR | 20190050145 | 5/2019 |
| KR | 20190071387 | 6/2019 |
| SU | 1 399 116 | 5/1988 |

(56) References Cited

FOREIGN PATENT DOCUMENTS

| WO | WO 89/12019 | 12/1989 |
|---|---|---|
| WO | WO 9524544 A1 | 9/1995 |
| WO | WO 98/19799 | 5/1998 |
| WO | WO 2008/102052 | 8/2008 |
| WO | WO 2011/161304 | 12/2011 |
| WO | WO 2012/052615 | 4/2012 |
| WO | WO 2012/089928 | 7/2012 |
| WO | WO 2012/156579 | 11/2012 |
| WO | WO 2013/068115 | 5/2013 |
| WO | WO 2014/202998 | 12/2014 |
| WO | WO 2016/070412 | 5/2016 |
| WO | WO 19/056102 | 3/2019 |
| WO | WO 2019/207202 | 10/2019 |
| WO | WO 2019/215384 | 11/2019 |
| WO | WO 2020/053195 | 3/2020 |
| WO | WO2020/079125 | 4/2020 |
| WO | WO 2020/082176 | 4/2020 |

OTHER PUBLICATIONS

International Search Report and Written Opinion of PCT/FI2019/050321, dated Jul. 30, 2019, in 13 pages.
International Search Report and Written Opinion issued in PCT/FI2019/050322 dated Aug. 28, 2019.
International Search Report and Written Opinion of PCT/FI2019/050319, dated Jul. 29, 2019, in 17 pages.
Extended European Search Report issued in PCT/FI2019/050320 dated Jan. 24, 2022.
Extended European Search Report issued in PCT/FI2019/050322 dated Aug. 31, 2022.

\* cited by examiner

WASTE SORTING GANTRY ROBOT

The present invention relates to a waste sorting robot for sorting waste objects.

In the waste management industry, industrial and domestic waste is increasingly being sorted in order to recover and recycle useful components. Each type of waste, or "fraction" of waste can have a different use and value. If waste is not sorted, then it often ends up in landfill or incineration which has an undesirable environmental and economic impact.

Industrial waste may be passed to waste management centres because handling and disposing of waste is time consuming and requires specialist equipment. Accordingly, a waste management centre may sort waste to collect the most valuable and useful fractions. For example, industrial waste may include mixed wood and metal fractions (as well as other fractions) and sorted wood and metal fractions can be reused and sold to recyclers. Waste which is sorted into a substantially homogeneous fraction is more desirable and economical for recyclers. This is because less processing of the material is required before being recycled into new products and materials.

It is known to sort domestic and industrial waste in different ways. For many years waste has been manually sorted by hand on a conveyor belt. However hand sorting waste can be arduous and dangerous to the human sorter depending on the type of industrial or domestic waste being sorted. Furthermore, some waste sorting plants which use human sorters require multiple shifts in order to increase the output of sorted waste.

One approach for improving the safety and the output of waste sorting is to automate one or more aspects of the waste sorting. The automation can comprise a controller sending control and movement instructions to a manipulator for interacting with the physical objects. The combination of a controller sending control instructions to a manipulator can also be referred to as a "robot".

One such robotic waste sorting system is a "delta" robot suspended over a conveyor belt which moves objects to be sorted. The conveyor belt passes under the delta robot and within a working area of the delta robot. A working area of a robot is an area on a surface within which the robot is able to reach and manipulate an object. A working volume is the physical space within which the robot is able to move and manipulate an object. The working volume is determined by the height above the working area where the robot can manipulate an object. The working volume/area can also include chutes which are not part of the surface of a conveyor belt.

A delta robot comprises a servo housing and a plurality of arms which are connected to one or more servos for moving the arms. The arms extend down from the servo housing to a base which is coupled to a manipulator. The arms are connected via universal joints at the base.

Whilst a delta robot can be relatively effective at picking small light objects, the delta robot is not suitable for lifting heavy objects. Furthermore since the manipulator is suspended from the servo housing, the servos must have sufficient power to move the manipulator and the object. This means that the manipulators coupled to delta robots must be as light as possible to increase the maximum lift capacity of the delta robot.

Disadvantageously, the dimensions of the working volume for a delta robot varies across the width of the working space. In particular, the working volume is an inverted cone and becomes narrower as the manipulator moves away from the servo housing. In practice, this may mean that a delta robot cannot manipulate objects at the same height across the width of a conveyor belt and that delta robots are only suitable for working with narrow conveyor belts. This can be problematic because objects can be piled on each other making identifying and picking objects harder. This can limit the design choices and use applications when using a delta robot for waste sorting.

A delta robot is not particularly robust and the universal joints of a delta robot are particularly susceptible to wear and malfunction. Another consideration of a delta robot is that the movement of one or more arms causes movement in the other arms. Accordingly, whenever a delta robot moves, control instructions must be sent to each servo because each arm must move when the manipulator of the delta robot is moved. The non-linear control instructions to move the arms of the delta robot means that increased computational processing is required to control and move the delta robot within the working area/working volume.

Another known robot for automatic sorting of waste is a "gantry" robot. A gantry robot comprises a frame or gantry which engages the floor and bridges over a working area such as a conveyor belt. The gantry supports the weight of the manipulator and an object that the manipulator grips. The gantry robot comprises one or more axes of control which move in a straight line (e.g. linear). Normally the axes of control of a gantry robot are arranged at right angles to each other.

A gantry robot may pick objects from the conveyor belt and drop the picked objects into a chute. A chute comprises an opening which is in communication with a bin or another conveyor belt for receiving a particular fraction of waste. The picked objects placed in the bin or on the conveyor belt can then be moved to another location or step in waste processing. This means a picked object of a certain waste fraction is dropped into the corresponding chute. Known gantry robots have a four or more chutes located at the four corners of the rectangular working space for receiving the different fractions.

It is known for automatic robotic sorting systems to use finger grippers or other articulated jaws for gripping objects to be sorted. A problem with finger grippers is that they have a specific plane in which the fingers or jaws close. This means that in order to successfully grip objects on a conveyor belt, the finger gripper or jaws must rotate. The rotation requires a rotation servo which increases the weight and complexity of the manipulator.

A known alternative gripper is a suction gripper which uses negative pressure for sucking and gripping an object to be sorted. A problem with existing suction grippers is that a large vacuum pump is required to generate sufficient negative pressure for the suction gripper. Accordingly a long vacuum hose must be used to connect the vacuum pump to the suction gripper. The vacuum hose is bulky and can become blocked with foreign objects. Unblocking the vacuum hose can require inspecting the entire length of the vacuum hose which requires substantial downtime of the automatic robotic system.

Embodiments of the present invention aim to address the aforementioned problems.

According to an aspect of the present invention there is a waste sorting robot gripper comprising: a suction cup engageable with the surface of a waste object, the suction cup having an air hole for evacuating air from the suction cup; a suction tube coupled to the suction cup wherein the suction tube comprises a longitudinal axis and a first air inlet in fluid communication with the air hole at one end of the suction tube and an air outlet at the other end of the suction tube wherein a path of the air flow between the air inlet and the air outlet is substantially along the longitudinal axis; wherein the suction tube comprises a second air inlet in fluid communication with an air source, the second air inlet being between the first air inlet and the air outlet. Advantageously, this means that the waste sorting suction gripper only requires a single air hose to operation. Indeed, this means that no vacuum hose is required. This makes the waste sorting robot gripper lighter and the more manoeuvrable.

Furthermore, this means that the suction gripper is easily to unblock because the suction air flow is in a straight line along the suction tube. This means that any objects that have blocked the suction tube can be cleared with a rod or a bottle brush.

Optionally the air hole is aligned with the longitudinal axis of the suction tube. By aligning the suction tube with the suction cup, the suction air flow is more efficient and there are less losses in the pneumatic system generating the negative pressure for the suction gripper.

Optionally the air source is pressurised. By using compressed air, the pressure of the air source that is input at the second air inlet is increased. This means that the negative pressure generated can be near vacuum (e.g. −0.9 Bar).

Optionally the second air inlet is aligned with the longitudinal axis of the suction tube. By aligning the second air inlet with the longitudinal axis of the suction tube, the suction air flow is more efficient and there are less losses in the pneumatic system generating the negative pressure for the suction gripper.

Optionally the second air inlet is an annular opening. This means that the second air inlet limits the occlusion or does not occlude the suction tube. This increases the efficiency of the suction tube.

Optionally the annular opening is coaxial with the longitudinal axis of the suction tube. By aligning the second air inlet with the longitudinal axis of the suction tube, the suction air flow is more efficient and there are less losses in the pneumatic system generating the negative pressure for the suction gripper.

Optionally the second air inlet is in the interior wall of the suction tube. Optionally the annular opening comprises an oblique opening such that pressurised air is introduced in a direction towards the air outlet. This means the second air inlet does not protrude into the suction tube. Accordingly, the second air inlet does not block the suction air flow in the suction tube.

Optionally the suction tube is coupled to a blow tube. In this way, the suction gripper can provide suction and a positive pressure for unblocking the suction tube.

Optionally the blow tube comprises a longitudinal axis and a first air inlet at one end of the blow tube and an air outlet at the other end of the blow tube wherein the air outlet of the blow tube is coupled to the air outlet of the suction tube and the path of the air flow between the air inlet of the blow tube and the air outlet of the blow tube is substantially along the longitudinal axis; wherein the blow tube comprises a second air inlet in fluid communication with an air source and the second air inlet of the blow tube is between the first air inlet of the blow tube and the air outlet of the blow tube.

Optionally the suction tube is not identical to the blow tube. This means that the suction tube and the blow tube can be optimised respective for generating negative pressure and positive pressure.

Optionally the longitudinal axis of the blow tube is aligned with the longitudinal axis of the suction tube. This means that the positive pressure for unblocking is more efficient at unblocking the suction tube.

Optionally the waste sorting robot gripper is in fluid communication with a valve for selectively causing a flow of air to the second air inlet of the suction tube. This means that the suction air flow can be operatively turned on and off with a valve. Optionally the valve is a solenoid valve which can controlled automatically.

Optionally the valve is configured to selectively cause a flow of air to either the second air inlet of the suction tube or the second air inlet of the blowing tube. This means that a single air source can be used to generate negative pressure for a suction air flow or a positive pressure for unblocking the suction tube.

In another aspect of the present invention, there is a waste sorting robot comprising a waste sorting robot gripper according to any of the previous embodiments. Optionally the waste sorting robot is a waste sorting gantry robot.

In another aspect of the present invention there is a waste sorting robot gripper comprising: a suction cup engageable with the surface of a waste object, the suction cup having an air hole for evacuating air from the suction cup; a suction tube coupled to the suction cup wherein the suction tube comprises a longitudinal axis and a first air inlet in fluid communication with the air hole at one end of the suction tube and an air outlet remote from the one at the other end of the suction tube wherein a path of the air flow is between the air inlet and the air outlet is substantially along the longitudinal axis; wherein the suction tube comprises a second air inlet in fluid communication with an air source, the second air inlet being between the first air inlet and the air outlet.

Optionally, the air outlet is mounted on a side of the suction tube. Optionally, the suction tube comprises a longitudinal axis. Optionally, the first air inlet is substantially aligned with the longitudinal axis at the one end of the suction tube and the air outlet is at the other end of the suction tube. Optionally the second air inlet is mounted on the side of the suction tube.

Optionally, the suction tube comprises an opening for receiving a cleaning tool. Optionally, the cleaning tool is one or more of a moveable cleaning tool, a moveable brush, a water jet, or an air jet. Optionally, the moveable cleaning tool is mounted in the opening and arranged to move between a retracted position and an extended position whereby the moveable cleaning tool intersects with the air flow path between the first air inlet and the air outlet. Optionally, the moveable cleaning brush is moveable substantially along the longitudinal axis of the suction tube.

In another aspect of the present invention there is a waste sorting robot gripper comprising: a suction cup engageable with the surface of a waste object, the suction cup having an air hole for evacuating air from the suction cup; a suction tube coupled to the suction cup wherein the suction tube comprises a longitudinal axis and a first air inlet in fluid communication with the air hole at one end of the suction tube and an air outlet at the other end of the suction tube wherein a path of the air flow is between the air inlet and the air outlet is substantially along the longitudinal axis; wherein the suction tube comprises a second air inlet in fluid communication with an air source, the second air inlet being between the first air inlet and the air outlet wherein the suction tube is coupled to a blow tube. comprising a longitudinal axis and a first air inlet at one end of the blow tube and an air outlet at the other end of the blow tube wherein the air outlet of the blow tube is coupled to the air outlet of the suction tube and the path of the air flow between the air inlet of the blow tube and the air outlet of the blow tube is substantially along the longitudinal axis; wherein the blow tube comprises a second air inlet in fluid communication with an air source and the second air inlet of the blow tube is between the first air inlet of the blow tube and the air outlet of the blow tube.

A waste sorting robot gripper comprising: a suction cup engageable with the surface of a waste object, the suction cup having an air hole for evacuating air from the suction cup; a suction tube coupled to the suction cup wherein the suction tube comprises a longitudinal axis and a first air inlet in fluid communication with the air hole at one end of the suction tube and an air outlet at the other end of the suction tube wherein a path of the air flow is between the air inlet and the air outlet is substantially along the longitudinal axis; wherein the suction tube comprises a second air inlet in fluid communication with an air source, the second air inlet being between the first air inlet and the air outlet wherein the suction tube is coupled to a blow tube and the second air inlet is in fluid communication with a valve for selectively causing a flow of air to the second air inlet of the suction tube wherein the valve is configured to selectively cause a flow of air to either the second air inlet of the suction tube or a flow of air to the blow tube.

Various other aspects and further embodiments are also described in the following detailed description and in the attached claims with reference to the accompanying drawings, in which:

Figure 1:
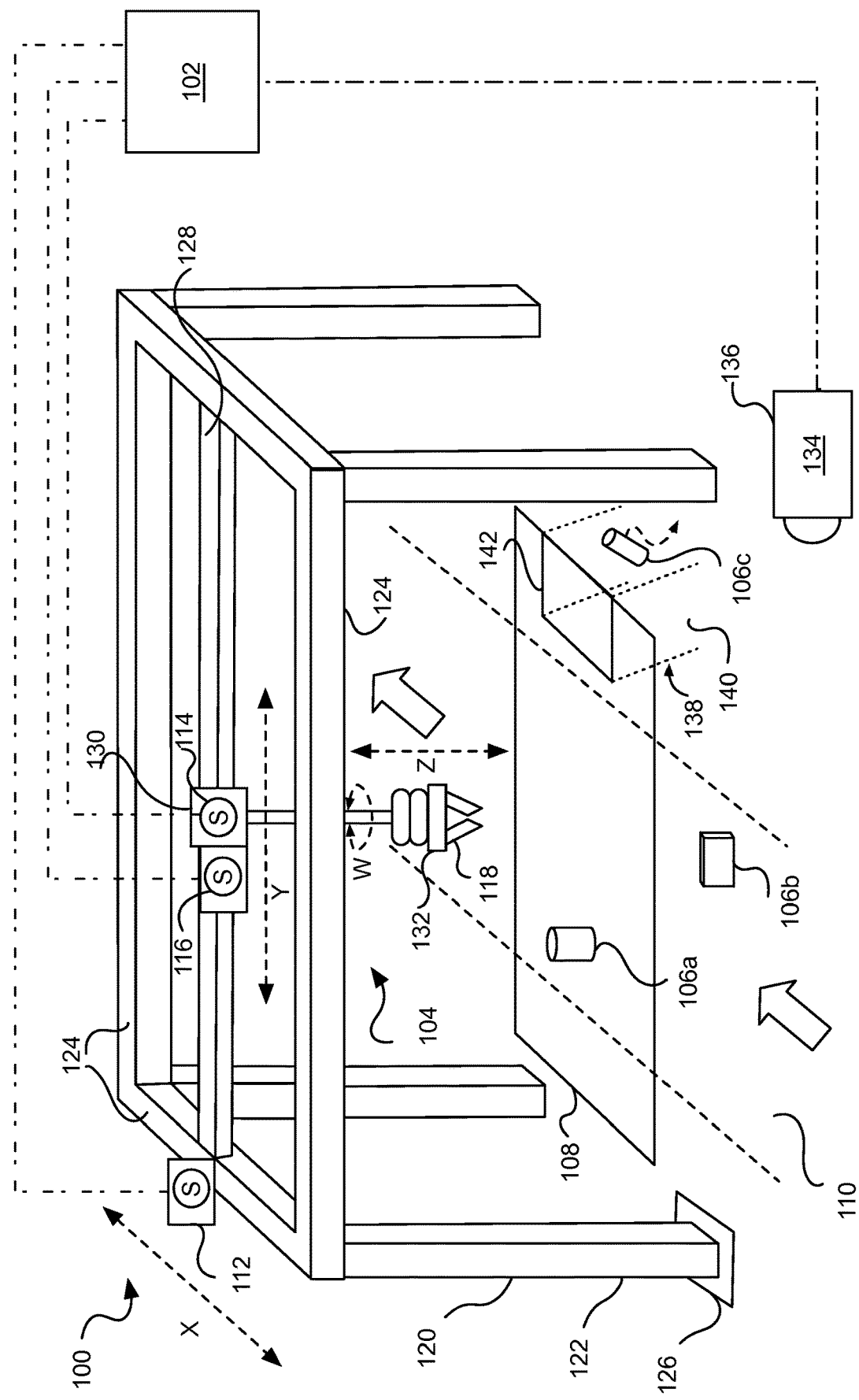
FIG. 1 shows a perspective schematic view of the waste sorting gantry robot.

FIG. 1 shows a schematic perspective view of a waste sorting robot 100. In some embodiments, the waste sorting robot 100 can be a waste sorting gantry robot 100. In other embodiments other types of waste sorting robots can be used. For the purposes of brevity, the embodiments will be described in reference to waste sorting gantry robots, but can also be other types of robot such as robot arms or delta robots.

In some embodiments, the waste sorting robot 100 is a Selective Compliance Assembly Robot Arm (SCARA). The waste sorting SCARA 100 may move in the X, Y, and Z planes like the waste sorting gantry robot, but incorporate movement in a theta axis at the end of the Z plane to rotate the end-of-arm tooling e.g. the gripper assembly 132. In some embodiments, the waste sorting robot 100 is a four axis SCARA robot 100 that consists of an inner link arm (not shown) that rotates about the Z-axis. The inner link arm is connected to an outer link arm (not shown) that rotates about a Z elbow joint (not shown). The Z elbow joint is connected to a wrist axis (not shown) that moves up and down and also rotates about Z. In some embodiments the waste sorting SCARA 100 comprises an alternative configuration which has the linear Z motion as the second axis.

For the purposes of brevity, the embodiments will be described in reference to waste sorting gantry robots 100, but any of the other aforementioned robot types can be used instead or in addition to the water sorting gantry robot 100.

The waste sorting gantry robot comprises a controller 102 for sending control and movement instructions to a manipulator 104 for interacting with the physical objects 106a, 106b, 106c. The combination of a controller sending control instructions to a manipulator can also be referred to as a "robot". The controller 102 is located remote from the manipulator 104 and is housed in a cabinet (not shown). In other embodiments, the controller 102 can be integral with the manipulator and/or a gantry frame 120.

The manipulator 104 physically engages and moves the objects 106a, 106b, 106c that enters the working area 108. The working area 108 of a manipulator 104 is an area within which the manipulator 104 is able to reach and interact with the object 106a 106b, 106c. The working area 108 as shown in FIG. 1 is projected onto the conveyor belt 110 for the purposes of clarity. The manipulator 104 is configured to move at variable heights above the working area 108. In this way, the manipulator 104 is configured to move within a working volume defined by the height above the working area 108 where the robot can manipulate an object. The manipulator 104 comprises one or more components for effecting relative movement with respect to the objects 106a, 106b, 106c. The manipulator 104 will be described in further detail below.

The physical objects 106a, 106b, 106c are moved into the working area 108 by a conveyor belt 110. The path of travel of the conveyor belt 110 intersects with the working area 108. This means that every object 106a, 106b, 106c that is moving on the conveyor belt 110 will pass through the working area 108. The conveyor belt 110 can be a continuous belt, or a conveyor belt formed from overlapping portions. The conveyor belt 110 can be a single belt or alternatively a plurality of adjacent moving belts.

In other embodiments, the physical objects 106a, 106b, 106c can be conveyed into the working area 108 via other conveying means. The conveyor can be any suitable means for moving the objects 106a, 106b, 106c into the working area 108. For example, the objects 106a, 106b, 106c are fed under gravity via slide (not shown) to the working area 108. In other embodiments, the objects can be entrained in a fluid flow, such as air or water, which passes through the working area 108.

The direction of the conveyor belt 110 is shown in FIG. 1 by two arrows. The objects 106a, and 106b are representative of different types of objects to be sorted having not yet been physically engaged by the manipulator 104. In contrast, the object 106c is an object that has been sorted into a particular type of object. In some embodiments, the manipulator 104 interacts with only some of the objects 106c. For example, the waste sorting gantry robot 100 is only removing a particular type of objects. In other scenarios, the manipulator 104 will interact and sort every object 106a, 106b, 106c which is on the conveyor belt 110.

In some embodiments, the objects to be sorted are waste products. The waste products can be any type of industrial, commercial, domestic waste or any other waste which requires sorting and processing. Unsorted waste material comprises a plurality of fractions of different types of waste. Industrial waste can comprise fractions, for example, of metal, wood, plastic, hardcore and one or more other types of waste. In other embodiments, the waste can comprise any number of different fractions of waste formed from any type or parameter of waste. The fractions can be further subdivided into more refined categories. For example, metal can be separated into steel, iron, aluminium etc. Domestic waste also comprises different fractions of waste such as plastic, paper, cardboard, metal, glass and/or organic waste.

A fraction is a category of waste that the waste can be sorted into by the waste sorting gantry robot 100. A fraction can be a standard or homogenous composition of material, such as aluminium, but alternatively a fraction can be category of waste defined by a customer or user.

In some embodiments, the waste can be sorted according to any parameter. A non-limiting list of parameters for dividing unsorted waste into fractions is as follows: material, previous purpose, size, weight, colour, opacity, economic value, purity, combustibility, whether the objects are ferrous or any other variable associated with waste objects. In a further embodiment, a fraction can comprise one or more other fractions. For example, one fraction can comprise a paper fraction, a cardboard fraction, and a wood fraction to be combinable to be a combustible fraction. In other embodiments, a fraction can be defined based on the previous purpose of the waste object, for example plastic tubes used for silicone sealant. It may be desirable to separate out some waste objects because they are contaminated and cannot be recycled. For example, a fraction can be 90% of a sorted material e.g. wood.

The objects are fed from a hopper or other stored source of objects onto the conveyor belt 110. Alternatively, the waste objects are fed from another conveyor belt (not shown) and there is no source of stored waste objects. In this case, the additional conveyor belt can be fed manually from e.g. an excavator. Optionally, the objects 106a, 106b, 106c can be pre-processed before being placed on the conveyor belt. For example, the objects can be washed, screened, crushed, ripped, shaken, vibrated to prepare the material before sorting. Alternatively, the waste objects 106a, 106b, 106c can be sorted with another robot or mechanical device. The objects 106a, 106b, 106c can be optionally pre-sorted before being placed on the conveyor belt 110. For example, ferrous material can be removed from the unsorted waste by passing a magnet in proximity to the conveyor belt 110. Large objects can be broken down into pieces of material which are of a suitable size and weight to be gripped by the manipulator 104.

The manipulator 104 is configured to move within the working volume. The manipulator 104 comprises one or more servos for moving the manipulator 104 in one or more axes. In some embodiments, the manipulator 104 is moveable along a plurality of axes. In some embodiments, the manipulator is moveable along three axes which are substantially at right angles to each other. In this way, the manipulator 104 is movable in an X-axis which is parallel with the longitudinal axis of the conveyor belt 110 ("beltwise"). Additionally, the manipulator 104 is movable across the conveyor belt 110 in a Y-axis which is perpendicular to the longitudinal axis of the conveyor belt 110 ("widthwise"). The manipulator 104 is movable in a Z-axis which is in a direction normal to the working area 108 and the conveyor belt 110 ("heightwise"). Optionally, the manipulator 104 can rotate about one or more axes. In some embodiments a gripper assembly 132 coupled to the manipulator 104 can rotate about a W-axis. The gripper assembly 132 is discussed in further detail below.

The directions of movement of the manipulator 104 within the working space along the X-axis, Y-axis and the Z-axis are shown by the two headed arrows with dotted lines. The manipulator 104 is moved with respect to the conveyor belt 110 by an X-axis servo 112, a Y-axis servo 114 and a Z-axis servo 116 respectively along the X-axis, the Y-axis and the Z-axis. The servos 112, 114, 116 are connectively connected to the controller 102 and controller 102 is configured to issue instructions for actuating one or more servos 112, 114, 116 to move the manipulator 104 within the working space. The connections between the servos 112, 114, 116 and the controller 102 are represented by dotted lines. Each connection between the servo 112, 114, 116 and the controller 102 can comprises one or more data and/or power connections.

Since the directions of movement of the manipulator 104 are substantially perpendicular to each other, movement of the manipulator in one of the axes is independent of the other axes. This means that the manipulator 104 movement can be defined in a cartesian coordinate frame of reference which makes processing movement instructions by the controller 102 simpler.

As mentioned previously, the manipulator 104 is mounted on a frame 120. In some embodiments, the frame 120 can be a gantry frame 120. In other embodiments, the frame 120 can be other structures suitable for supporting the manipulator 104 above the working area 108. For example, the frame 120 can be a structure for suspending the manipulator 104 above the working area with rods and/or cables. Hereinafter, the frame 120 will be referred to a gantry frame 120 but can be applicable to other frames for supporting a manipulator 104.

The gantry frame 120 comprises vertical struts 122 which engage with the floor or another substantially horizontal surface. In some embodiments, the vertical struts 122 can be tilted upright struts. In this way, the tilted upright struts are angled to the vertical. The tilted upright struts may be required to mount the gantry frame 120 to the floor in a non-standard installation. FIG. 1 shows the gantry frame 120 comprising four vertical struts 122 coupled together by horizontal beams 124. In other embodiments, the horizontal beams 124 can be tilted lateral beams 124. This may be required if the waste sorting gantry robot 100 is being installed in a small or unusual space. In other embodiments, there can be any suitable number of vertical struts 122. The beams 124 and struts 122 are fixed together with welds, bolts or other suitable fasteners. Whilst the horizontal beams 124 are shown in FIG. 1 to be located above the conveyor belt 110, one or more horizontal beams 124 can be positioned at different heights. For example, one or more horizontal beams 124 can be positioned underneath the conveyor belt. This can lower the centre of mass of the gantry frame 120 and make the entire waste sorting gantry robot 100 more stable if the vertical struts 122 are not secured to the floor.

The beams 124 and the struts 122 are load bearing and support the weight of the manipulator 104 and an object 106a, 106b, 106c that the manipulator 104 grasps. In some embodiments, the beams 124 and struts 122 are made from steel but other stiff, lightweight materials such as aluminium can be used. The vertical struts 122 can each comprise feet 126 comprising a plate through which bolts (not shown) can be threaded for securing the struts 122 to the floor. For the purposes of clarity, only one foot 126 is shown in FIG. 1, but each strut 122 can comprise a foot 126. In other embodiments, there are no feet 126 or fasteners for securing the gantry frame 120 to the floor. In this case, the gantry frame rests on the floor and the frictional forces between the gantry frame and the floor are sufficient to prevent the waste sorting gantry robot from moving with respect to the floor.

The manipulator 104 comprises at least one movable horizontal beam 128 which is movably mounted on the gantry frame 120. The moveable beam 128 can be mounted in a beam carriage (not shown). The moveable horizontal beam 128 is movably mounted on one or more of the other fixed horizontal beams 124 of the gantry frame 120. The moveable horizontal beam 128 is movable in the X-axis such that the manipulator 104 moves in the X-axis when the movable horizontal beam moves in the X-axis. The moveable horizontal beam 128 is mounted to the fixed horizontal beams 124 via an X-axis servo mechanism 112. In some embodiments, the servo 112 is coupled to the moveable horizontal beam 128 via a belt drive. In other embodiments, the servo is coupled to the moveable horizontal beam via a rack and pinion mechanism. In some embodiments, other mechanisms can be used to actuate movement of the moveable horizontal beam along the X-axis. For example, a hydraulic or pneumatic system can be used for moving the movable horizontal beam 128.

The X-axis servo 112 can be mounted on the moveable beam 128 or on the fixed horizontal beams 124. It is preferable for the X-axis servo to be mounted on the fixed horizontal beams 124 such that the X-axis servo does not have to exert force moving its own weight.

A manipulator carriage 130 is movably mounted on the moveable horizontal beam 128. The manipulator carriage 130 is moveable along the longitudinal axis of the movable horizontal beam 128. In this way, the manipulator carriage 130 is movable in the Y-axis relative to the moveable beam 128. In some examples, the manipulator carriage 130 comprises a Y-axis servo mechanism 114 for moving the manipulator carriage 130 along the Y-axis. In other examples, the Y-axis servo 114 is not mounted in the manipulator carriage 130 and manipulator carriage 130 moves with respect to the Y-axis servo. In some examples, the servo 114 is coupled to the moveable horizontal beam 128 via a belt drive. In other examples, the servo 114 is coupled to the moveable horizontal beam 128 via a rack and pinion mechanism. In some examples, other mechanisms can be used to actuate movement of the moveable horizontal beam along the Y-axis. For example, a hydraulic or pneumatic system can be used for moving the manipulator carriage 130.

When the manipulator carriage 130 moves along the Y-axis, a gripper assembly 132 also moves in the Y-axis. The gripper assembly 132 is movably mounted to the manipulator carriage 130. The gripper assembly 132 is movable in the Z-axis in order to move the manipulator 104 heightwise in the Z-axis direction.

In some embodiments, the gripper assembly 132 comprises a Z-axis servo mechanism 116 for moving the gripper assembly 132 along the Z-axis. In other embodiments, the Z-axis servo 114 is not mounted in the gripper assembly 132 but is mounted in the manipulator carriage 130. In this way, the gripper assembly 132 moves with respect to the Z-axis servo 116. In some embodiments, the servo 116 is coupled to the gripper assembly 132 via a belt drive. In other embodiments, the servo 116 is coupled to the gripper assembly 132 via a rack and pinion mechanism. In some embodiments, other mechanisms can be used to actuate movement of the moveable horizontal beam along the Z-axis. For example, a hydraulic or pneumatic system can be used for moving the gripper assembly 132.

As mentioned, the manipulator 104 as shown in FIG. 1 comprises a gripper assembly 132. In one embodiment, the gripper assembly 132 comprises a pair of jaws 118 configured to grip objects 106a, 106b, 106c. A gripper assembly 132 comprising a pair of jaws 118 is also known as a "finger gripper." The gripper jaws 118 are actuated with a servo (not shown) for opening and closing the jaws 118. The servo for the gripper jaws 118 is connectively coupled to the controller 102 so that the controller 102 can actuate the opening and closing of the jaws 118. In some embodiments, the gripper assembly 132 further comprises a rotation servo (not shown) to rotate the gripper assembly 132 and/or the gripper jaw 118 about the W-axis. In some embodiments the W-axis and the Z-axis are coaxial, but in other embodiments the W-axis and the Z-axis are offset This means that the gripper jaws 118 can be rotated to better grasp long thin objects across their narrow dimensions.

Additionally or alternatively in a more preferable embodiment, the gripper assembly 132 can be a suction gripper (as shown in FIGS. 2 to 6) for gripping the objects using negative pressure. The suction gripper can have a suction cup which is substantially symmetric about the Z-axis. This means that the suction gripper does not need to be rotated about the Z-axis to achieve an optimal orientation with respect to the objects 106a, 106b, 106c. This means that the gripper assembly rotation servo is not required with a suction gripper. In the case with an asymmetrical suction gripper 132, the gripper assembly 132 comprises a rotation servo to rotate the gripper assembly 132 about the W-axis as previously discussed above. For example, the suction gripper 132 can have an elongate suction cup 400. Additionally or alternatively, the suction gripper 132 can comprises a plurality of suction grippers. For example, the suction gripper 132 can comprise an asymmetrical suction gripper 132 comprising two suction tubes 414 each with a suction cup 400.

In other embodiments, the gripper assembly 132 of the manipulator 104 can be any suitable means for physically engaging and moving the objects 106a, 106b, 106c. Indeed, the manipulator 104 can be one or more tools for grasping, securing, gripping, cutting or skewering objects. In further embodiments the manipulator 104 can be a tool configured for interacting with and moving an object at distance such as an electromagnet or a nozzle for blowing compressed air.

As mentioned, the controller 102 is configured to send instructions to the servos 112, 114, 116 of the manipulator 104 to control and interact with objects 106a, 106b, 106c on the conveyor belt 110. The controller 102 is connectively coupled to at least one sensor 134 for detecting the objects 106a, 106b, 106c on the conveyor belt 110. The at least one sensor 134 is positioned in front of the manipulator 104 so that detected measurements of the objects 106a, 106b, 106c are sent to the controller 104 before the objects 106a, 106b, 106c enter the working area 108. In some embodiments, the at least one sensor 134 can be one or more of a RGB camera, an infrared camera, a metal detector, a hall sensor, a temperature sensor, visual and/or infrared spectroscopic detector, 3D imaging sensor, terahertz imaging system, radioactivity sensor and/or a laser. The at least one sensor 134 can be any sensor suitable for determining a parameter of the object 106a, 106b, 106c.

FIG. 1 shows that the at least one sensor 134 is positioned in one position. The at least one sensor 134 is mounted in a sensor housing 136 to protect the sensor 134. In other embodiments, a plurality of sensors are positions along and around the conveyor belt 110 to receive parameter data of the objects 106a, 106b, 106c.

The controller 102 receives information from the at least one sensor 134 corresponding to one or more objects 106a, 106b, 106c on the conveyor belt 110. The controller 102 determines instructions for moving the manipulator 104 based on the received information according to one or more criteria. Various information processing techniques can be adopted by the controller 102 for controlling the manipulator 104. Such information processing techniques are described in WO2012/089928, WO2012/052615, WO2011/161304, WO2008/102052 which are incorporated herein by reference.

Once the manipulator 104 has received instructions from the controller 102, the manipulator 104 executes the commands and moves the gripper assembly 132 to pick an object 106c from the conveyor belt 110. The process of selecting and manipulating an object on the conveyor belt 110 is known as a "pick".

Once a pick has been completed, the manipulator 104 drops or throws the object 106c into a chute 138. An object 106c dropped into the chute 138 is considered to be a successful pick. A successful pick is one where an object 106c was selected and moved to the chute 138 associated with the same fraction of waste as the object 106c.

The chute 138 comprises a chute opening 142 in the working area 108 for dropping picked objects 106c. The chute opening 142 of the chute 138 is adjacent to the conveyor belt 110 so that the manipulator 104 does not have to travel far when conveying a picked object 106c from the conveyor belt 110 to the chute opening 142. By positioning the chute opening 142 of the chute adjacent to the conveyor belt 110, the manipulator 104 can throw, drop, pull and/or push the object 106c into the chute 138.

The chute 138 comprises walls 140 defining a conduit for guiding picked objects 106c into a fraction receptacle (not shown) for receiving a sorted fraction of waste. In some embodiments, a fraction receptacle is not required at the sorted fractions of waste are piled up beneath the chute 138. FIG. 1 only shows one chute 138 associated with the manipulator 104. In other embodiments, there can be a plurality of chutes 138 and associated openings 142 located around the conveyor belt 110. Each opening 142 of the different chutes 138 is located within the working area 108 of the manipulator 104. The walls 140 of the conduit can be any shape, size or orientation to guide picked objects 106c to the fraction receptacle. In some embodiments, the successfully picked objects 106c move under the force of gravity from the chute opening 142 of the chute 138 to the fraction receptacle. In other embodiments, the chute 138 may guide the successfully picked objects 106c to another conveyor belt (not shown) or other means for moving the successfully picked objects 106c to the fraction receptacle.

Figure 2:
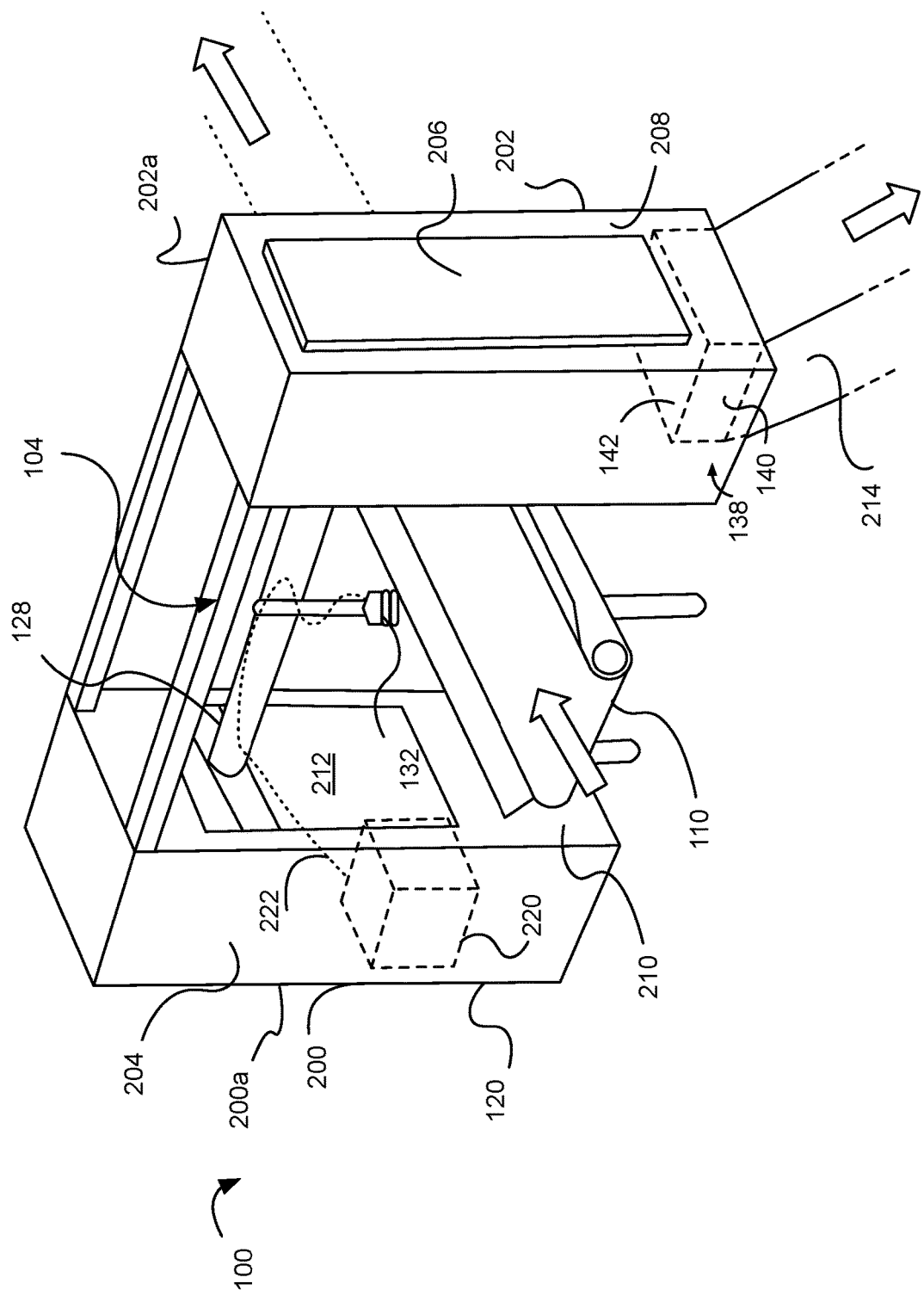
FIG. 2 shows another perspective schematic view of the waste sorting gantry robot.

Turning to FIG. 2, another embodiment will be discussed. FIG. 2 shows a schematic perspective view of a waste sorting gantry robot 100. The conveyor belt 110 is positioned between the gantry frame 120. For the purposes of clarity, no objects 106a, 106b, 106c have been shown on the conveyor belt 110.

The gantry frame 120 as shown in FIG. 2 comprises a different configuration and construction from that shown in FIG. 1. In particular, the gantry frame 120 comprises two cabinets 200, 202. The cabinet 200, 202 comprise internal struts and horizontal beams similar to those discussed in reference to the embodiments shown in FIG. 1. However the cabinet structures 200, 202 comprise sheet material 204 to cover the struts and the horizontal beams providing the walls, top and bottoms of the cabinets 200, 202.

The cabinets 200, 202 provide shielding for the delicate parts to the manipulator 104 such as the servos (not shown for clarity). This helps protect the manipulator from be damaged from stray waste objects. Furthermore, the cabinet structures 200, 202, provide a barrier between the moving parts and the human operator. This means that the human operator cannot accidentally stray into the working area 108 of the waste sorting gantry robot. The gantry frame 120 comprises at least one enclosure 200a, 202a. The enclosure 200a, 202a surrounds at least a part of the gantry frame 120. In some examples, there can be a plurality of enclosures 200a, 202a, each surrounding one or more parts of the waste sorting gantry robot 100. The enclosure 200a, 202a can be a solid sheet material or can be perforated so that one or more internal parts of the waste sorting gantry robot 100 are visible. The enclosure 200a, 202a for example, surrounds the chute 138 on three sides. The enclosure 200a, 202a also surrounds at least a portion of the manipulator 104. In other examples, the enclosure 200a, 202a can completely surround and enclose the waste sorting gantry robot 100. In this case, the enclosure 200a, 202a comprises openings for the waste sorting objects 106a, 106b, 106c to be conveyed into the working area 108.

The gripper assembly 132 as shown in FIG. 2 is a suction gripper 132. The suction gripper 132 is in fluid communication with a pneumatic system 220. The pneumatic system 220 comprises at least one hose 222 for connecting the suction gripper 132 to the pneumatic system 220. In some embodiments, the hose is an air hose 222 for providing a source of air to the suction gripper 132. In some embodiments, there is a single, unitary air hose connected to the suction gripper 132. By providing only one air hose 222 to the suction gripper 132, installation and maintenance of the waste sorting robot 100 is simplified. Furthermore, by only having one air hose and not requiring a long vacuum hose for the suction gripper 132, there are less energy losses due to friction in the pneumatic system 220. Operation of the suction gripper 132 using the single air hose 222 will be discussed in further detail below.

The air hose 222 is flexible and threaded along the movable horizontal beam 128 in to the cabinet 200. In some embodiments, (not shown in FIG. 2) the air hose 222 can be inserted within the hollow moveable beam 128. The hose 222 is sufficiently flexible to move and flex so as to change shape as the manipulator 104 moves without impeding the movement of the manipulator 104.

At least a portion of the pneumatic system 220 is housed in the cabinet 200 or the gantry frame 120. The pneumatic system 220 can comprise an air compressor for generating a source of compressed air. Optionally, the pneumatic system 220 can also comprise an air storage tank (not shown) for compressed air. Furthermore, the pneumatic system 220 can also comprise one or more valves 224 for selectively providing air to the suction gripper 132. In some embodiments, the air compressor generates an air source having a pressure of 8 Bar. In other embodiments, the air source has a pressure of 5 Bar to 10 Bar. In other embodiments, the air source can have any suitable pressure above atmospheric pressure.

The pneumatic system 220 is schematically shown as being located within the cabinet 200. However, in other embodiments the pneumatic system 220 can be partially or wholly located remote from the waste sorting robot 100. For example, there may be a plurality of waste sorting robots 100 on a sorting line (not shown) each of which require a source of air. In this way, a single air compressor can be connected to a plurality of waste sorting robots 100 via a plurality of air hoses 222. Accordingly, the pneumatic system 220 may be located between waste sorting robots 100.

Figure 3:
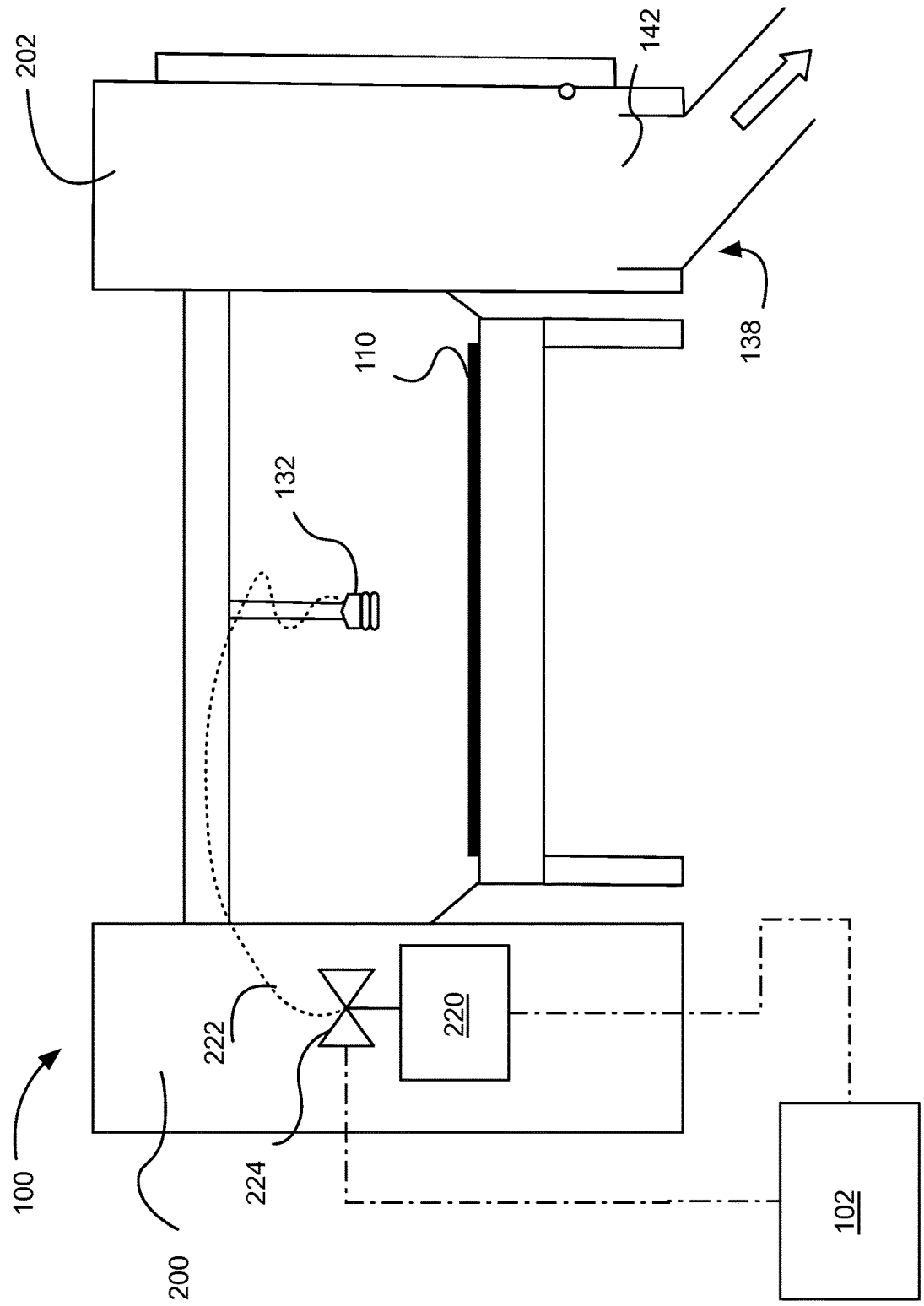
FIG. 3 shows a schematic cross-sectional view of the waste sorting gantry robot.

FIG. 3 shows a schematic cross section of the waste sorting gantry robot 100. Operation of the pneumatic system 220 is controlled by the controller 102. This means that the controller 102 can selectively operate e.g. the air compressor or the valve 224 of the pneumatic system 220 to deliver a supply of air to the suction gripper 132.

Figure 4:
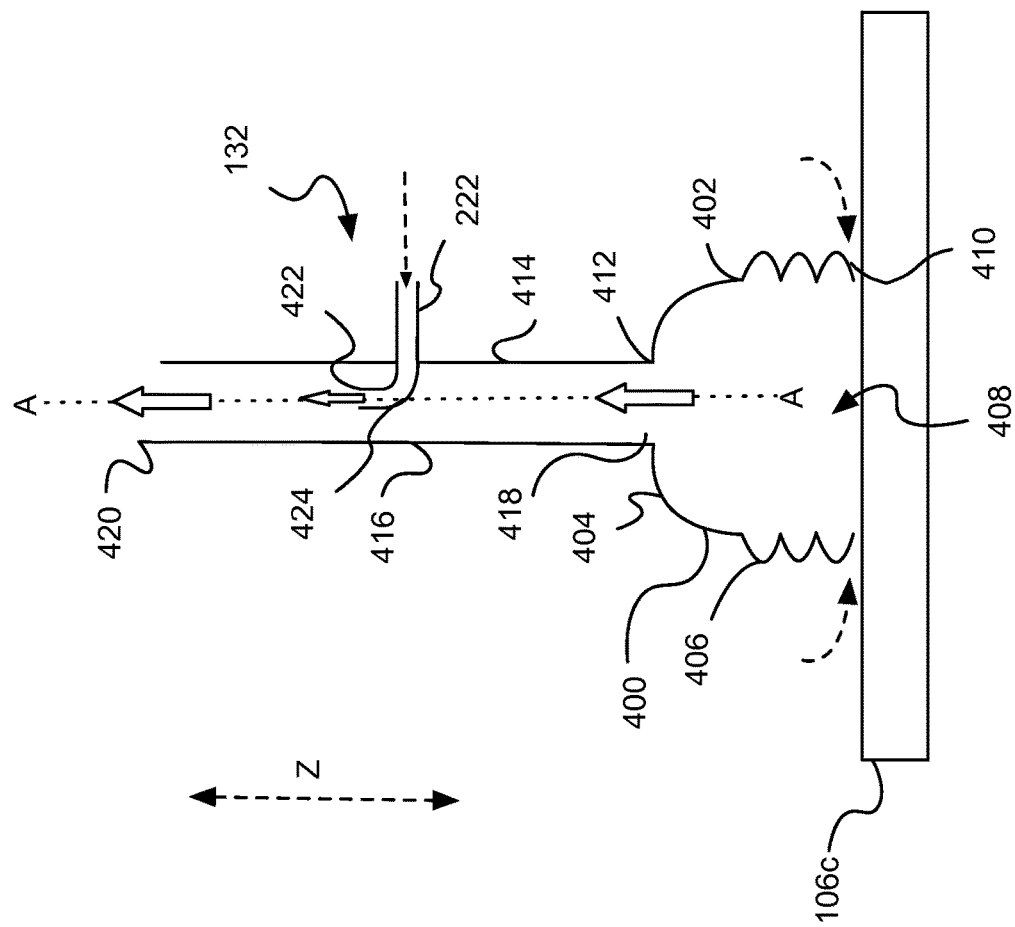
FIG. 4 shows a schematic cross-sectional view of a gripper assembly.

An embodiment of the suction gripper 132 will now be discussed in reference to FIG. 4. FIG. 4 shows a cross sectional side view of the suction gripper 132 in operation. The suction gripper 132 comprises a suction cup 400 having a side wall 402 and a top wall 404 and a suction mouth 408. In some embodiments the suction cup 400 does not have a top wall 404 and the side wall 402 does not narrow towards the top of the suction cup 400. The suction mouth 408 of the suction cup 400 is arranged to engage with an object to be sorted 106c. The suction cup 400 comprises a hollow construction and a generally circular cross-section (across the Z-axis). In other embodiments, the suction cup 400 is elongate across the Z-axis and has a rectangular or oval cross-sectional shape.

As mentioned in some embodiments, the suction cup 400 can be elongate and/or asymmetrical about one or more axes. In this case, the gripper assembly 132 comprises a rotation servo to rotate the gripper assembly 132 about the W-axis as previously discussed in reference to FIG. 1.

In some embodiments, the side wall 402 of the suction cup 400 comprises a ribbed or concertinaed wall portion 406. The ribbed wall portion 406 creates a resiliently flexible portion in the suction cup 400 such that the suction cup 400 preferentially compresses in the Z-axis. In this way, when the suction cup 400 descends in the direction of the Z-axis and engages the object 106c, the ribbed wall portion 406 help absorbs force of the impact which protects the manipulator 104. Furthermore, the concertina shape of the side wall 402 allows the suction cup 400 to conform to the shape of the object to be picked 106a, 106b.

The suction cup 400 is made from a resiliently deformable material such as silicon, rubber or other similar material. This means that the suction cup 400 can deform when the suction cup abuts an irregular shape. Accordingly, the suction cup 400 can make a better seal between the lip 410 of the side wall 402 and the object 106c to be picked.

Figure 7:
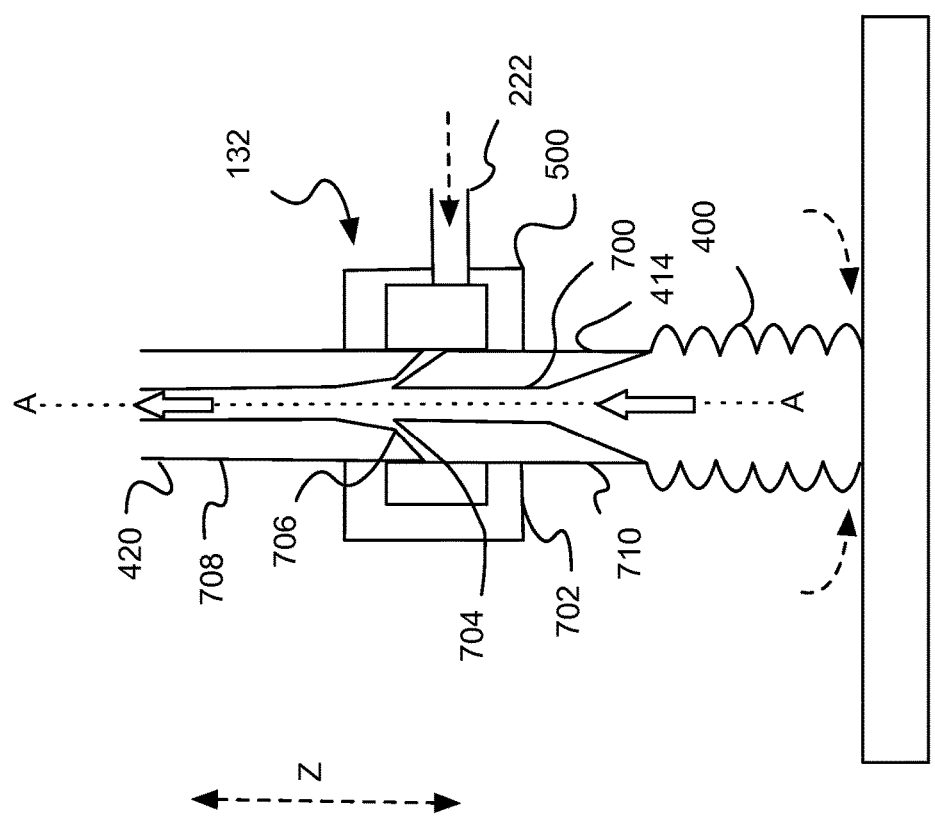
FIG. 7 shows a schematic cross-sectional view of another a gripper assembly.

The top wall 404 of the suction cup 400 comprises an air hole 412 in fluid communication with a first air inlet 418 of a suction tube 414 for evacuating air from the space within the suction cup 400. The air hole 412 comprises a diameter which is the same size as the diameter of the suction tube 414. This means that the air can flow easier between the suction cup 400 to the suction tube 414. In some other embodiments, the suction cup 400 has a cylindrical shape and the suction cup 400 does not have a top wall 404 (as shown in FIG. 7). In this way, the diameter of the side wall 402 is the same as the diameter of the suction tube 414. In other embodiments, the diameters of the air hole 412 and the suction tube 414 may be different. In this case, there is a seal between the air hole 412 and the suction tube 414 so that no air flow is enters between the join of the suction cup 400 at the air hole 412 and the suction tube 414.

The suction tube 414 comprises an elongate side wall 416. The suction tube 414 comprises the first air inlet 418 at one end and an air outlet 420 at another end. The elongate side wall 416 comprises a longitudinal axis A-A which is substantially parallel with the Z-axis. Both the first air inlet 418 and the air outlet 420 may be aligned with the longitudinal axis A-A of the suction tube 414 as shown in FIG. 4. This means that the suction air flow path from the first air inlet 418 to the air outlet 420 is a straight line. This means that there are no curves or blockages which impede the air flow in the suction tube 414. In other embodiments discussed later, the first air inlet 418 and the air outlet 420 are not both aligned with the longitudinal A-A of the suction tube 414.

The air hole 412 is sealed to the first air inlet 418. The suction cup 400 can be glued to the suction tube 414 between the air hole 412 and the first air inlet 418. In other embodiments, the suction cup 400 and the suction tube 412 are integral and there is no join between the air hole 412 and the first air inlet 418.

The suction tube 414 is cylindrical and comprises a circular cross-sectional shape (across the Z-axis). In other embodiments, the suction tube is not a cylinder and comprises an oval, square, rectangular, or irregular cross-sectional shape. The suction tube 414 as shown in FIG. 4 comprises a uniform diameter, but the suction tube 414 can vary in width along the longitudinal length of the suction tube 414. In some embodiments, the suction tube 414 is between 5 cm to 20 cm long.

The suction air flow through the suction gripper 132 enters from the mouth 408 suction cup 400, through the air hole 412, along the suction tube 414, and exits the suction tube 414 at the air outlet 420. Arrows represent air flow into, through and out of the suction gripper 132 as shown in FIG. 4.

The negative pressure generated for the suction air flow will now be described. The suction air flow for the suction gripper 132 is generated near the suction cup 400 of the suction gripper 132, which avoids the need for a vacuum hose.

The suction tube 414 comprises a second air inlet 422 which is in fluid communication with the air hose 222. Accordingly, the second air inlet 422 introduces an air source of compressed air into the suction tube 414 between the first air inlet 418 and the air outlet 420. In this way the air source of compressed air exits the second air inlet 422 and the source of compressed air is introduced into the suction air flow path. The second air inlet 422 is in the side wall 416 of the suction tube 414 and so the air source is initially introduced perpendicular to the longitudinal axis A-A of the suction tube 414. However, the second air inlet 422 also directs the air flow into the suction tube 414 towards the air outlet 420. In some embodiments, the second air inlet 422 comprises a curved nozzle 424 for changing the direction of the air source towards the air outlet 420. The curved nozzle 424 is coaxial with the longitudinal axis A-A. In other embodiments, the curve nozzle 424 is not coaxial with the suction tube 414 and points towards the air outlet 420. In other embodiments, the second air inlet 422 comprises a nozzle directed at an angle to the longitudinal axis A-A.

In some embodiments, the second air inlet 422 can be any suitable nozzle for introducing an air flow into the suction tube 414.

The second air inlet 422 introduces a fast, high pressure source of air into the suction tube 414. The second air inlet 422 is narrower than the suction tube 414 and so the air flow emerging from the second air inlet 422 expands into the wider volume of the suction tube 414. As the air source from the second air inlet 422 expands in the suction tube 414, it reduces in velocity and mixes with the air in the suction tube 414. The momentum of the air emerging from the second air inlet 422 mixing with the air in the suction tube 414 causes the mixed air to move towards the air outlet 420. As the air in the suction tube 414 moves towards the air outlet 420, a negative pressure is created in the suction tube between the second air inlet 422 and the first inlet 416. A negative pressure is also created in the suction cup 400 since the suction cup 400 is in fluid communication with the suction tube 414.

Depending on the quality of the seal between the suction cup 400 and the object 106c, some air will enter the suction cup 400 due to the negative pressure in the suction cup 400. Once the negative pressure is low enough, the suction gripper 132 will generate sufficient force to pick up and convey the object 106c. In some embodiments, the object 106c is released by stopping the flow of air into the suction tube 414 from the second air inlet 422. This increases the air pressure in the suction cup 400 and the object 106c will fall away from suction cup 400 due to the force of gravity.

Advantageously, the arrangement shown in FIG. 4 is a simple construction and generates the negative pressure at the suction cup 400. This means that a vacuum hose which is coupled to a vacuum pump is not required. Indeed, a smaller, lighter flexible air hose is only required to generate suction at the suction cup 400.

The arrangement as shown in FIG. 4 provides advantages over known Venturi pumps. Existing Venturi pumps require an airflow through a narrowing throat portion in a pipe. The narrowing throat portion in the pipe causes an increase in the velocity of the fluid which reduces the pressure. A suction pipe is connected to the throat portion where the low pressure is created and used to generate a negative pressure. A problem with this arrangement is that the suction pipe requires a bend, which is often at 90 degrees at the junction between the throat portion and the suction pipe. This is unsuitable for pumps in the waste sorting environment because the waste sorting centres are dusty and dirty. In particular, the objects 106a, 106b, 106c to be sorted can be covered in dirt and/or debris. Such dirt or debris can easily be sucked into the suction gripper, which may also be on the conveyor belt 110. Indeed, it is to be expected that at some point foreign objects will enter the suction gripper 132 and cause blockages. Therefore, a bend in the suction pipe will increase the likelihood of a blockage.

Figure 5:
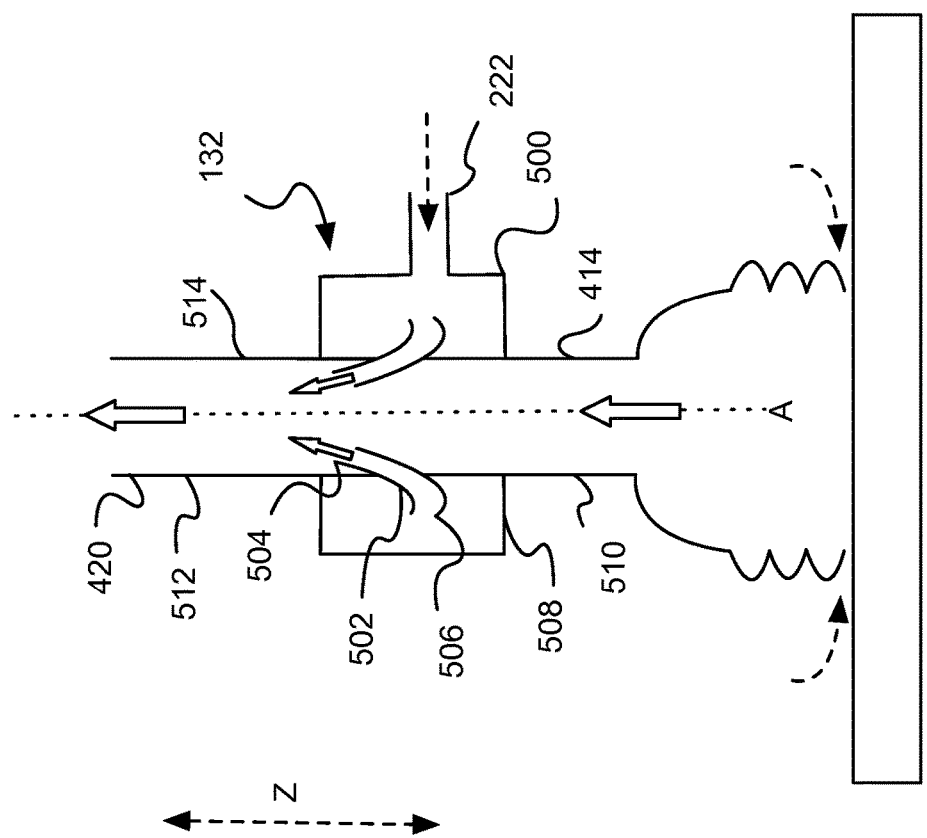
FIG. 5 shows a schematic cross-sectional view of another gripper assembly.
Figure 6:
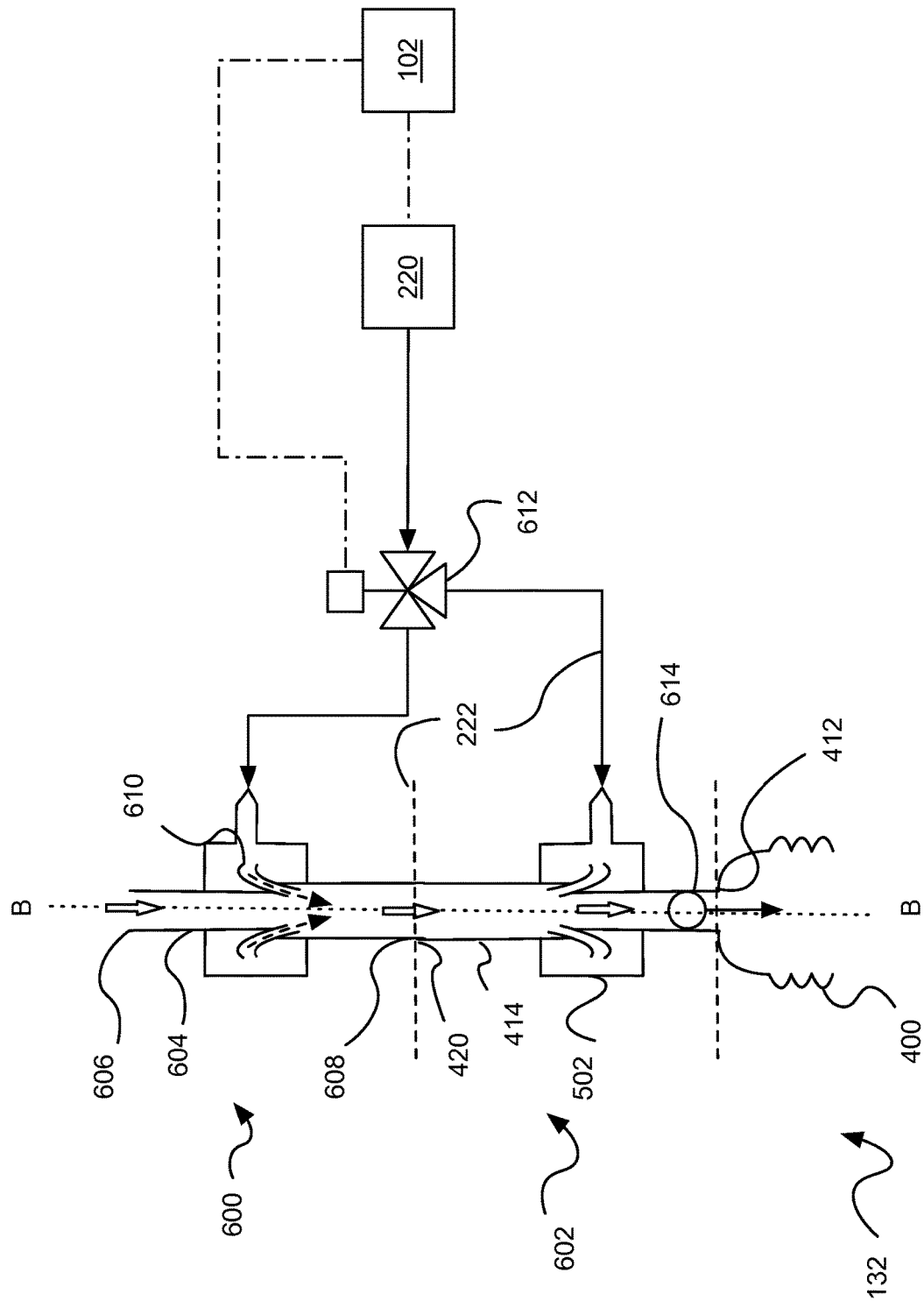
FIG. 6 shows a schematic cross-sectional view of yet another a gripper assembly.

In contrast, the arrangement as shown in the embodiments in FIGS. 4 to 6 ensure that the negative pressure air flow, that is the air flow from the suction cup 400 to the air outlet 420, is substantially in a straight line. This means that blockages are less likely. Nevertheless even if a blockage does occur, the axially straight suction tube 414 means that clearing the blockage is easier. This is because a rod or bottle cleaner can be used dislodge blockages. Furthermore, the length of the suction tube 414 is approximately 5 cm to 20 cm long which means locating any blockage in the apparatus that generates the negative pressure is easy. In some embodiments, the suction tube 414 is coupled to a silencer for reducing the noise caused by the air flow. The silencer (not shown) is a chamber coupled to the air outlet 420 with a plurality of air outlets for letting the compressed air escape in a plurality of different directions. If the silencer is coupled to the suction tube 414, then the total length of the suction gripper 132 may exceed 20 cm. The suction gripper 132 is compact and if the suction gripper 132 is unrepairable, the entire suction gripper 132 is easily replaceable. Accordingly, the operator removes the air hose 222 from the second air inlet 422 of old suction gripper 132 and connects the air hose 222 to the second air inlet 422 of a new suction gripper 132.

Another embodiment of the suction gripper 132 will now be described with respect to FIG. 5. FIG. 5 shows a cross-sectional side view of the suction gripper 132. The suction gripper 132 is the same as the embodiments shown in reference to FIG. 4 except that the second air inlet 500 has a different structural arrangement. Indeed, the operation of the suction gripper 132 as shown in FIG. 5 is the same as the embodiments described in reference to FIG. 4.

The parts of the suction gripper 132 that are the same as those shown in FIG. 4 will be referenced using the same reference numbers.

The second air inlet 500 comprises an annular nozzle 502 which is coaxial with the suction tube 414. The annular nozzle 502 is in fluid communication with the air hose 222. The air hose 222 is coupled to a nozzle housing 508. The nozzle housing 508 surrounds the annular nozzle 502 and seals against the suction tube 414. This means that air flowing from the air hose 222 to the annular nozzle 502 does not escape outside the suction tube 414. The annular nozzle 502 comprises a nozzle inlet 506 and a nozzle outlet 504. The nozzle outlet 504 directs the air flow into the suction tube 414 and in the direction of the air outlet 420.

The nozzle housing 508 is connected to the suction tube 414 either side of the annular nozzle 502 in the direction of the longitudinal axis A-A. This increases the mechanical strength of the suction tube 414 and the annular nozzle 502. In some embodiments, the suction tube 414 comprises an upper part 512 and a lower part 510 which are coupled together by the nozzle housing 508. In this way, the annular nozzle 502 is sandwiched between the upper part 512 and the lower part 510. In other embodiments, the upper part 512 and the lower part 510 are integral and there are a plurality holes (not shown) circumferentially arranged in the side wall 416 to allow air to flow into the suction tube 414 via the annular nozzle 502.

As shown in FIG. 5, the nozzle outlet 504 of the annular nozzle 502 protrudes into the suction tube 414. Alternatively in some other embodiments, the nozzle outlet 504 is flush with the interior wall 514 of the suction tube 414. In this way, the annular nozzle does not obscure any part of the suction tube 414.

The air flow exits the annular nozzle 502 and creates an annular air flow towards the air outlet 420. Advantageously, the annular nozzle 502 creates an initial air flow with a greater surface area when compared to the point-like nozzle previously discussed with reference to FIG. 4. Accordingly the air flow from the annular nozzle 502 entrains more air from the suction tube 414 into the air flow moving towards the air outlet 420. This creates a larger air flow in the suction tube 414 and increases the negative pressure. Accordingly, the suction gripper 132 is more efficient.

Furthermore, the annular nozzle 502 does not block the centre of the cross-section area of the suction tube 414. This means that the air flow is not blocked by the nozzle itself. Instead, the annular nozzle 502 narrows the diameter of the suction tube 414. This means that the suction tube is less likely to become blocked by foreign objects which ingress into the suction tube 414. Indeed, using a rod or a bottle cleaner is easier to clear blockages.

Another embodiment will now be discussed in reference to FIG. 7. FIG. 7 shows a schematic cross-sectional view of another a gripper assembly 132. The suction gripper 132 is the same as the embodiments discussed with reference to FIGS. 4, 5 and 6, except that some of the structure of the gripper assembly 132 is different.

As mentioned previously the suction cup 400 is substantially cylindrical and the air hole 412 of the suction cup 400 is the same diameter as the suction cup 400. The suction tube or suction pipe 414 comprises a solid wall construction with an internal bore 700. The internal bore 700 is longitudinally aligned with the longitudinal axis A-A of the suction tube 414, similar to the previously discussed embodiments. The internal bore 700 at the first air inlet tapers from the diameter of the suction cup 400 to the diameter of the internal bore 700.

The second air inlet 500 is similar in construction to the embodiment discussed in reference to the embodiments shown in FIG. 5. The housing 702 comprises a chamber 704 for receiving the compressed air from the air hose 222. The chamber 704 may be in fluid communication with the annular nozzle 706 that intersects with the internal bore 700. In this way, the annular nozzle 706 is not a separate element but defined by the internal walls of the housing 702 and the suction tube 414. In some embodiments, the suction tube 414 comprises a first part 708 and a second part 710. The first and second parts 708, 710 are mounted in the housing 702 and spaced apart from each other to define the annular nozzle 706. The rate of flow of the compressed air into the suction tube 414 can be varied by changing the relative width of the annular nozzle 706. The width of the annular nozzle 706 can be varied by changing the separation of the first and second parts from each other. In particular, the first and/or the second parts can be screw mounted into the housing 702. By screwing the first and/or the second parts in and out of the housing, the relative distance between the first and second parts 708, 710 can be changed. Accordingly, this can change the rate at which the compressed air enters the suction tube 414 and varies the suction force.

Figure 8:
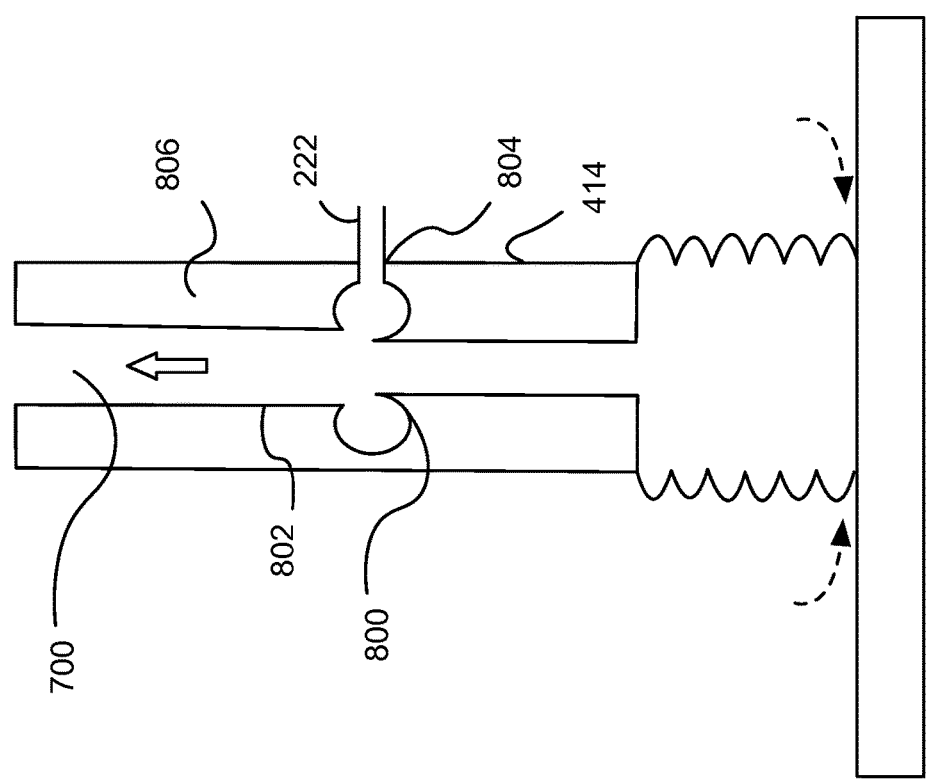
FIG. 8 shows a schematic cross-sectional view of another a gripper assembly.

Another embodiment will now be described with reference to FIG. 8. FIG. 8 shows a partial cross-sectional side view of another gripper assembly 132. FIG. 8 is similar to the embodiments as shown in reference to FIGS. 4, 5, 6, and 7. However the suction tube 414 in FIG. 8 does not have a nozzle housing.

In some embodiments, there is a single annular hole 800 in the wall 806 of the suction tube 414. The single annular hole 800 is a donut-shaped cavity wherein the inside of the donut shaped cavity intersects with the surface 802 of the internal bore 700 of the suction tube 414. The annular hole 800 is in fluid communication with the internal bore 700. The annular hole 800 is connected to a hole 804 in the wall 806 connected to the air hose 222. In this way the annular hole 800 provides the same functionality as the annular nozzle described with reference to the previous embodiments.

Turning back to FIG. 6, an arrangement for unblocking the suction gripper 132 will now be discussed. FIG. 6 shows a cross-sectional side view of a modified suction gripper 132.

The suction gripper 132 is predominantly the same as the suction gripper 132 as described in the embodiments with reference to the other Figures. Indeed, the suction cup 400, the suction tube 414 and the annular nozzle 502 are the same as shown in FIG. 5. The embodiments discussed in reference to FIGS. 7 and 8 can also be used with the arrangement discussed in reference to FIG. 6.

The suction gripper 132 comprises a suction component 602 which is the same as the suction gripper 132 arrangement as shown in FIGS. 5, 7, 8. Accordingly, the suction component 602 will not be described in any further detail. The suction gripper 132 also comprises a blow component 600. The suction cup 400, the blow component 600 and the suction component 602 are indicated by the dotted lines perpendicular to the axis B-B. The blow component 600 is the essentially the same as the suction component 602 but reversed in orientation to generate a positive air pressure rather than a negative air pressure. In some embodiments, the suction component 602 is optimized for maximum gripping/suction force. In other embodiments, the blow component 600 is additionally and/or alternatively be optimized for maximum ability to remove blockages. The arrangement as shown in FIG. 6 comprises identical components, however in alternative embodiments, the suction component 602 and the blow components are not identical.

The blow component 600 comprises the same features as the suction component 602. The blow component 600 comprises a blow tube 604. The blow tube 604 comprises an elongate side wall which is substantially cylindrical. The blow tube 604 comprises the first air inlet 606 at one end and an air outlet 608 at another end. The air outlet 608 is coupled to and in fluid communication with the air outlet 420 of the suction tube 414. The elongate side wall comprises a longitudinal axis B-B which is substantially parallel with the Z-axis. The longitudinal axis B-B of the blow tube 604 is the same as the longitudinal axis B-B of the suction tube 414.

Both the first air inlet 606 and the air outlet 608 of the blow tube 604 are aligned with the longitudinal axis B-B of the blow tube 604. This means that the air flow path from the first air inlet 606 to the air outlet 608 is a straight line. This means that there are no curves which impede the air flow in the blow tube 604.

Similarly to the suction tube 414, the blow tube 604 comprises a second air inlet 610 which is in fluid communication with the air hose 222. Accordingly, the second air inlet 610 of the blow tube 604 introduces an air source into the blow tube 604 between the first air inlet 606 and the air outlet 608. The second air inlet 610 is an annular nozzle similar to that described in FIG. 5. In other embodiments, the second air inlet 610 of the blow tube 604 can be any type of nozzle for introducing an air flow into the blow tube 604.

The air hose 222 is coupled to both of the second air inlets 422, 610 of the suction tube 414 and the blow tube 604 respectively. A three-way valve 612 is coupled to the air hose 222 for selectively providing an air flow to either the suction tube 414 or the blow tube 604. In some embodiments the three-way valve 612 can be replaced with two separate valve (not shown). This means that the suction gripper 132 can selectively be operated in a first mode whereby a negative pressure is provided at the suction cup 400 or a second mode whereby a positive pressure is provided at the suction cup 400. The three-way valve 612 comprises a solenoid for actuating the valve. The solenoid is controllable from instructions received from the controller 102. Alternatively the three-way valve could be actuated with a pneumatic control signal.

When the suction gripper 132 is in the first mode, the suction gripper 132 operates in the same way as the embodiments previously discussed in reference to FIGS. 4 and 5. The air flow travels from the suction tube 414 to the blow tube 604. In this way, the air flow exits the suction gripper at the first air inlet 606 of the blow tube 604. Accordingly, the first air inlet 606 of the blow tube 604 serves a dual purpose and is an air outlet in the first mode.

In the second mode the air flow through the suction gripper 132 is reversed. Indeed, FIG. 6 shows the blow component 600 in operation and the air flow flowing from the blow component 600 to the suction cup 400. Air is drawn in from the first air inlet 606 and flows through the blow tube 604 to the suction tube 414 and exits at the air hole 412 of the suction cup 400. The positive air pressure exerts a force on an object 614 causing a blockage in the suction tube 414. The force of the positive air flow can push the object 614 out from the suction cup.

The suction gripper 132 has been discussed being used in combination with a waste sorting gantry robot 100. However, the suction gripper 132 can be used with any sort of wasting sorting robot 100. For example, the suction gripper 132 can be used with delta robots, robot arms or any other manipulator 104 controlled by a controller 102.

In other embodiments, the suction gripper arrangements as described with respect to the FIGS. 1 to 6 can also be used with other types of object manipulation robots. For example, the suction gripper 132 can be used with industrial robots in the automotive industry, food industry etc.

Figure 9:
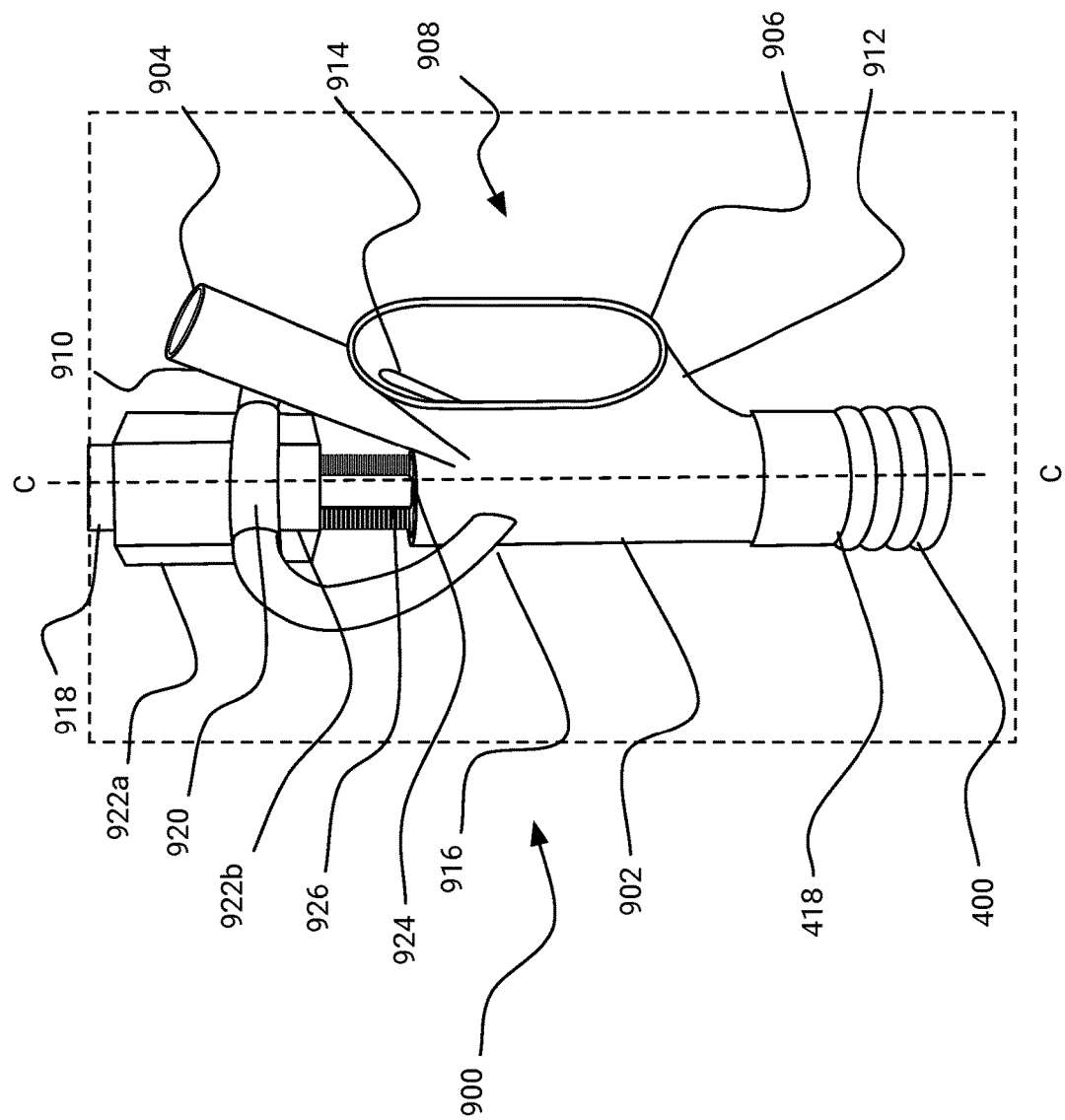
FIG. 9 shows a perspective view of another a gripper assembly.
Figure 10B:
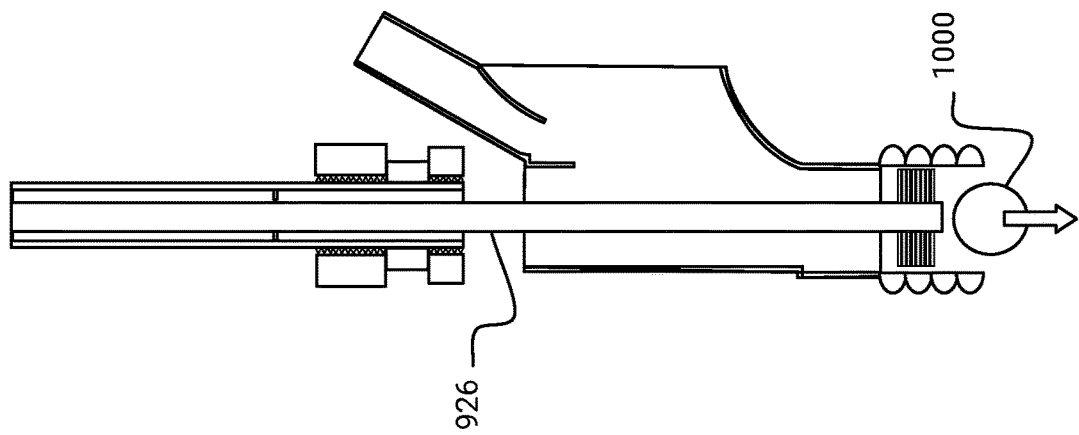
FIGS. 10a and 10b show a schematic cross-sectional view of another a gripper assembly.
Figure 10A:
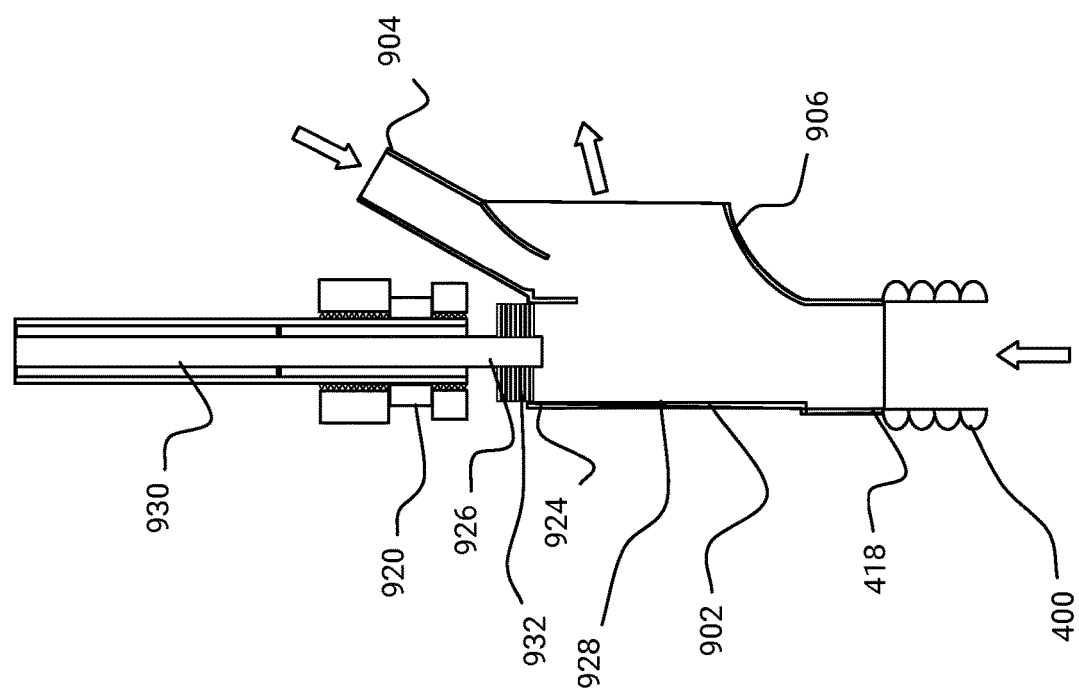
Figure 11:
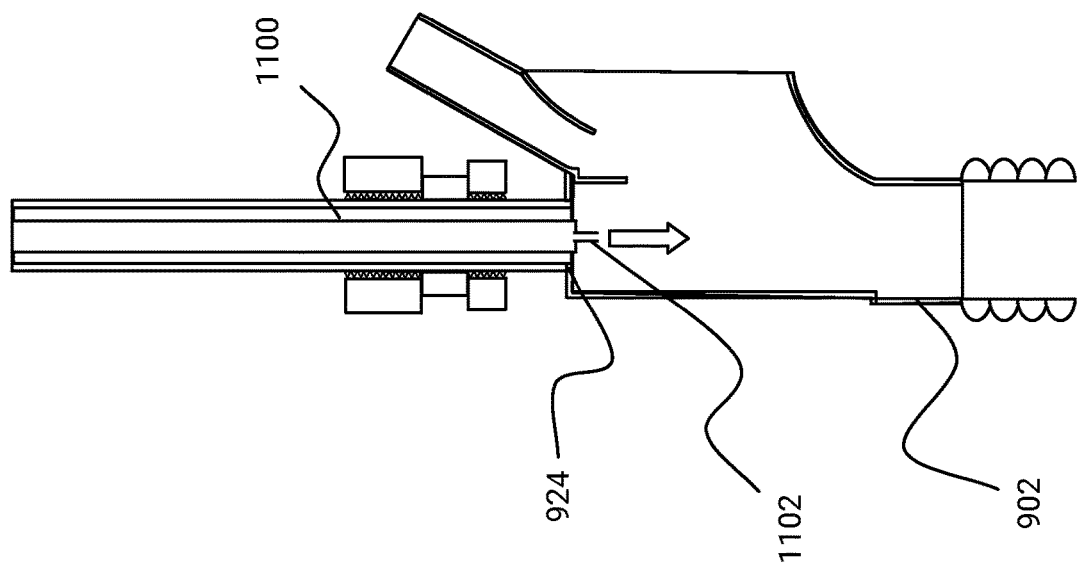
FIG. 11 shows a schematic cross-sectional view of another a gripper assembly.

Another embodiment of the suction gripper 900 will be discussed in references to FIGS. 9 to 11. FIG. 9 shows a perspective view of a suction gripper 900 according to an example. FIGS. 10a, 10b and 11 show a cross sectional view of the suction gripper 900. The suction gripper 900 as shown in FIGS. 9 to 11 operates in the same way as previously described to the embodiments discussed in reference to FIGS. 1 to 8.

However, in contrast, the suction gripper 900 has a different structural arrangement which will be discussed now. The suction gripper 900 comprises a suction cup 400 with an air hole 412 which is identical to the suction cup 400 previously described. Similarly the air hole 412 is in fluid communication with the first air inlet 418.

The suction gripper 900 comprises a suction tube 902 which is substantially cylindrical and comprises a circular cross-sectional shape across the longitudinal axis C-C.

The suction tube 902 is a unitary element comprising the first air inlet 418, the second air inlet 904 and the air outlet 906. The second air inlet 904 is remote from the first air inlet 418. The second air inlet 904 is offset from the suction tube 902 and is connected to the suction tube 902 at a side 908 of the suction tube 902 via an inlet tube 910. Similarly the air outlet 906 is connected to the suction tube 902 at the side 908 of the suction tube 902 via an outlet tube 912. In some embodiments, the inlet tube 910 and the outlet tube 912 are adjacent to each other. In some embodiments, there is an adjacent opening 914 between the inlet tube 910 and the outlet tube 912. The adjacent opening 914 encourages air flow between the second air inlet 904 and the air outlet 906.

Similar to the previous embodiments, the suction air flow through the suction gripper 900 enters from the suction cup 400, through the air hole 412, along the suction tube 902, and exits the suction tube 902 at the air outlet 906. Arrows represent air flow into, through and out of the suction gripper 132 as shown in FIG. 10a.

Likewise, the suction tube 902 comprises a second air inlet 904 which is in fluid communication with the air hose 222 (not shown in FIG. 9). Accordingly, the second air inlet 904 introduces compressed air into the suction tube 902 between the first air inlet 418 and the air outlet 906. In this way, compressed air is introduced intersecting the air flow path between the first air inlet 418 and the air outlet 906. The compressed air from the second air inlet 904 then flows to the air outlet 906, similar to the previously described embodiments.

The suction tube 902 comprises one or more mounting arms 916 connected to a collar 920 for mounting the suction tube 902 to a pipe 918 coupled to the manipulator 104. The collar 920 is fixed to the pipe 918 by fastening nuts 922a, 922b. Other fasteners can be used for securing the collar 920 to the pipe 918.

In an embodiment, the suction tube 902 comprises a tool opening 924 for receiving a cleaning tool 926 arranged to clean blockages from the suction tube 902. Operation of the cleaning tool 926 will be described in more detail with reference to FIGS. 10a and 10b.

The cleaning tool 926 may be a moveable cleaning tool 926 that moves between a retracted position and an extended position whereby the moveable cleaning tool 926 intersects with the air flow path between the first air inlet 418 and the air outlet 906.

FIG. 10a shows the cleaning tool 926 in a retracted position. In the retracted position, the cleaning tool 926 is seated within the tool opening 924. When the cleaning tool 926 is positioned within the tool opening 924, the cleaning tool 926 substantially seals the tool opening 924 in the suction tube 902. This means that the partial vacuum can be achieved and maintained when the compressed air is introduced from the second air inlet 904 and flows to the air outlet 906. In some embodiments, the cleaning tool 926 comprises a seal (not shown) for sealing the cleaning tool 926 in the tool opening 924.

In some embodiments, the cleaning tool 926 may be a brush whereby bristles 932 may sweep along the inner surface 928 of the suction tube 902. The cleaning tool 926 is mounted on a moveable actuation rod 930 housed within the pipe 918. The actuation rod 930 is moved between the retracted and the extended positions with a pneumatic piston (not shown). The pneumatic piston may be coupled to the existing air compressed air supply coupled to the second air inlet 904. In some other embodiments, the actuation rod 930 is coupled to another type of actuator other than a pneumatic piston such as a mechanical linkage coupled to a motor, a hydraulic piston or any other suitable actuator for moving the actuation rod in a linear direction along the axis C-C.

In other embodiments, the cleaning tool 926 does not comprise a brush and the actuation rod 930 is used to engage and dislodge blockages in the suction tube 902. In some embodiments, the cleaning tool 926 can be any suitable tool for engaging and moving blockages in the suction tube 902. For example the cleaning tool 926 can be a solid disc (not shown) mounted on the end of the actuating rod 930.

FIG. 10b shows the cleaning tool 926 in the extended position. Here the cleaning tool 926 has been extended and the cleaning tool 926 has moved through the suction tube 902. The cleaning tool 926 is shown in FIG. 10b with the cleaning tool 926 extended into the suction cup 400. In some embodiments, the cleaning tool 926 can extend and project out of the suction cup 400. As can be seen from FIG. 10b, the cleaning tool 926 has dislodged a blockage 1000 from the suction tube 902 or the suction cup.

In some embodiments, the schematic arrangement shown in FIG. 6 is modified so that the blow tube 600 is replaced with a pneumatically operated cleaning tool 926. In this way, the pneumatic actuator for the cleaning tool 926 is coupled to the valve 612 to selectively operate the cleaning tool 926.

In some embodiments, the cleaning tool 926 is an elongate cleaning tool 926 such as a brush with the longitudinal axis of the elongate cleaning tool 926 aligned with the longitudinal axis C-C of the suction tube 902. In this way, the operation of the cleaning tool 926 is simplified because the cleaning tool 926 is moveable in a linear direction along the longitudinal axis C-C of the suction tube 902. The arrangement shown in FIGS. 10a and 10b is more compact.

In some embodiments, the cleaning tool 1100 is not moveable and mounted in the tool opening 924. This will be described in further detail with respect to FIG. 11. In particular, the cleaning tool 1100 is a water jet with a nozzle 1102 aligned with the axis C-C. Accordingly, when the water jet is activated, the nozzle ejects a stream of water into the suction tube 902 which dislodges blockages. The cleaning tool 1100 can alternatively be a source of compressed air instead of a water jet. However, it is preferred that the cleaning tool 1100 is a water jet because the mass of the ejected water from the nozzle 1102 is greater and will more easily dislodge blockages than compressed air.

In some embodiments, the controller 102 is configured to actuate the cleaning tool 926. The controller 102 is connect to the valve 612 and controls the movement of the cleaning tool 926 between the retracted position and the extended position. In this way, the controller 102 controls movement of the cleaning tool 926 and clears blockages from the suction 902 by sending a control signal to the valve 612. In other embodiments and mentioned before, the actuation rod 930 is coupled to another type of actuator and the controller 102 is configured to send a control signal to the actuator such as a motor, piston, servo or any other suitable actuator for moving the cleaning tool 926 in a linear direction along the axis C-C.

In another embodiment two or more embodiments are combined. Features of one embodiment can be combined with features of other embodiments.

Embodiments of the present invention have been discussed with particular reference to the examples illustrated. However it will be appreciated that variations and modifications may be made to the examples described within the scope of the invention.

The invention claimed is:

1. A waste sorting robot gripper comprising:
a suction cup engageable with a surface of a waste object, the suction cup including an air hole for evacuating air from the suction cup;
a suction tube coupled to the suction cup, wherein the suction tube comprises a first air inlet in fluid communication with the air hole at one end of the suction tube and an air outlet remote from the one end of the suction tube, wherein a path of an air flow is between the air inlet and the air outlet, and wherein the suction tube comprises a second air inlet in fluid communication with an air source, the second air inlet being between the first air inlet and the air outlet;
a blow tube coupled to the suction tube and configured to unblock the suction tube, wherein the blow tube comprises a longitudinal axis and a first air inlet at a first end of the blow tube and an air outlet at a second end of the blow tube, wherein the air outlet of the blow tube is coupled to the air outlet of the suction tube and a path of the air flow between the air inlet of the blow tube and the air outlet of the blow tube is substantially along the longitudinal axis, and wherein the blow tube comprises a second air inlet in fluid communication with an air source and the second air inlet of the blow tube is between the first air inlet of the blow tube and the air outlet of the blow tube; and
a three-way valve in fluid communication with the second air inlet of the suction tube and the second air inlet of the blow tube, the three-way valve configured to switch between a first mode of operation in which negative pressure is provided to the suction cup and a second mode of operation in which positive pressure is provided to the suction cup.

2. A waste sorting robot gripper according to claim 1 wherein the air outlet is mounted on a side of the suction tube.

3. A waste sorting robot gripper according to claim 1 wherein the suction tube comprises a longitudinal axis.

4. A waste sorting robot gripper according to claim 3 wherein the first air inlet is substantially aligned with the longitudinal axis at the one end of the suction tube and the air outlet is at the other end of the suction tube.

5. A waste sorting robot gripper according to claim 3 wherein the air hole is aligned with the longitudinal axis of the suction tube.

6. A waste sorting robot gripper according to claim 3 wherein the second air inlet is aligned with the longitudinal axis of the suction tube.

7. A waste sorting robot gripper according to claim 1 wherein the air source is pressurized.

8. A waste sorting robot gripper according to claim 1 wherein the second air inlet is an annular opening.

9. A waste sorting robot gripper according to claim 8 wherein the annular opening is coaxial with the longitudinal axis of the suction tube.

10. A waste sorting robot gripper according to claim 8 wherein the annular opening comprises an oblique opening such that pressurized air is introduced in a direction towards the air outlet.

11. A waste sorting robot gripper according to claim 1 wherein the second air inlet is mounted on the side of the suction tube.

12. A waste sorting robot gripper according to claim 1 wherein the suction tube is not identical to the blow tube.

13. A waste sorting robot gripper according to claim 1 wherein the longitudinal axis of the blow tube is aligned with a longitudinal axis of the suction tube.

14. A waste sorting robot gripper according to claim 1, wherein the three-way valve is configured to selectively cause a flow of air from the air source to either be blocked or pass through the second air inlet of the suction tube, or the second air inlet of the blow tube.

15. A waste sorting robot gripper according to claim 1 wherein the suction tube comprises an opening for receiving a cleaning tool.

16. A waste sorting robot gripper according to claim 15 wherein the cleaning tool is one or more of a moveable cleaning tool, a moveable cleaning brush, a water jet, or an air jet.

17. A waste sorting robot gripper according to claim 16 wherein the cleaning tool is moveable substantially along the longitudinal axis of the suction tube.

18. A waste sorting robot gripper according to claim 15 wherein the cleaning tool is mounted in the opening and arranged to move between a retracted position and an extended position whereby the cleaning tool intersects with the air flow path between the first air inlet and the air outlet.

19. A waste sorting robot comprising a waste sorting robot gripper according to claim 1.

20. A waste sorting robot according to claim 19 wherein the waste sorting robot is a waste sorting gantry robot.

21. A waste sorting robot comprising:
a suction cup engageable with a surface of a waste object, the suction cup including an air hole for evacuating air from the suction cup;
a suction tube coupled to the suction cup, wherein the suction tube comprises a longitudinal axis and a first air inlet in fluid communication with the air hole at one end of the suction tube and an air outlet at the other end of the suction tube, wherein a path of an air flow is between the air inlet and the air outlet is substantially along the longitudinal axis, and wherein the suction tube comprises a second air inlet in fluid communication with an air source, the second air inlet being between the first air inlet and the air outlet;
a blow tube coupled to the suction tube and configured to unblock the suction tube, the blow tube comprising a longitudinal axis and a first air inlet at a first end of the blow tube and an air outlet at a second end of the blow tube, wherein the air outlet of the blow tube is coupled to the air outlet of the suction tube and the path of the air flow between the first air inlet of the blow tube and the air outlet of the blow tube is substantially along the longitudinal axis, and wherein the blow tube comprises a second air inlet in fluid communication with an air source and the second air inlet of the blow tube is between the first air inlet of the blow tube and the air outlet of the blow tube;

a three-way valve in fluid communication with the second air inlet of the suction tube and the second air inlet of the blow tube, the three-way valve configured to switch between a first mode of operation in which negative pressure is provided to the suction cup and a second mode of operation in which positive pressure is provided to the suction cup.

22. A waste sorting robot gripper comprising:

a suction cup engageable with a surface of a waste object, the suction cup including an air hole for evacuating air from the suction cup;

a suction tube coupled to the suction cup, wherein the suction tube comprises a longitudinal axis and a first air inlet in fluid communication with the air hole at a first end of the suction tube and an air outlet at a second end of the suction tube, wherein a path of an air flow is between the air inlet and the air outlet is substantially along the longitudinal axis, and wherein the suction tube comprises a second air inlet in fluid communication with an air source, the second air inlet being between the first air inlet and the air outlet; and a blow tube coupled to the suction tube and configured to unblock the suction tube, wherein the second air inlet of the suction tube is in fluid communication with a three-way valve comprising two outputs and one input, the three-way valve configured to switch between a first mode of operation in which negative pressure is provided to the suction cup and a second mode of operation in which positive pressure is provided to the suction cup.

* * * * *